United States Patent [19]
Johnson et al.

[11] Patent Number: 5,325,921
[45] Date of Patent: Jul. 5, 1994

[54] METHOD OF PROPAGATING A HYDRAULIC FRACTURE USING FLUID LOSS CONTROL PARTICULATES

[75] Inventors: Michael H. Johnson; Hang Nguyen, both of Spring, Tex.; Lewis B. Ledlow, Mandeville, La.

[73] Assignee: Baker Hughes Incorporated, Houston, Tex.

[21] Appl. No.: 964,413

[22] Filed: Oct. 21, 1992

[51] Int. Cl.$^5$ .......................................... E21B 43/267
[52] U.S. Cl. .................................... 166/280; 166/281; 166/283; 252/8.551
[58] Field of Search ............... 166/280, 281, 283, 292, 166/308; 252/8.551

[56] References Cited

U.S. PATENT DOCUMENTS

| | | | |
|---|---|---|---|
| 2,838,116 | 6/1958 | Clark, Jr. et al. | 166/280 |
| 3,281,354 | 10/1966 | Scott . | |
| 3,323,594 | 6/1967 | Huitt et al. | 166/280 |
| 3,408,296 | 10/1968 | Kuhn et al. | 166/280 X |
| 3,516,496 | 6/1970 | Barkman, Jr. et al. | 166/281 |
| 3,844,361 | 10/1974 | Jackson | 175/66 |
| 3,986,964 | 10/1976 | Smithey | 175/65 |
| 3,988,246 | 10/1976 | Harfiel | 175/65 |
| 4,025,443 | 5/1977 | Jackson | 252/8.551 |
| 4,098,700 | 7/1978 | Hartfiel | 252/8.551 |
| 4,109,721 | 8/1978 | Slusser | 166/281 X |
| 4,140,639 | 2/1979 | Jackson et al. | 252/8.551 |
| 4,549,608 | 10/1985 | Stowe et al. | 166/280 |
| 4,621,692 | 10/1986 | Mondshine | 166/281 |
| 4,817,717 | 4/1989 | Jennings, Jr. et al. | 166/278 |
| 4,887,690 | 12/1989 | Lord et al. | 166/280 X |
| 4,979,565 | 12/1990 | Jennings, Jr. | 166/278 |
| 5,054,554 | 10/1991 | Pearson | 166/280 |

FOREIGN PATENT DOCUMENTS

| | | |
|---|---|---|
| 8501309 | 3/1985 | PCT Int'l Appl. . |
| 1100110 | 1/1968 | United Kingdom . |

OTHER PUBLICATIONS

N. C. Mahajan, et al., "Bridging Particle Size Distribution: A Key Factor in the Designing of Non-Damaging Completion Fluids," *Fourth Symposium on Formation Damage Control of the SPE*, Jan. 28-29, 1980.

M. B. Smith, et al., "Tip Screenout Fracturing: A Technique for Soft, Unstable Formations," *SPE Production Engineering*, May, 1987, pp. 95-103.

J. L. Gidley, et al., *Recent Advances in Hydraulic Fracturing*, G. S. Penney, et al., Chapter 8, "Fluid Leakoff", SPE Richardson, Tex., 1989, pp. 147-176.

J. P. Martins, "Tip Screen-Out Fracturing Applied to the Ravenspurn South Gas Field Development", *64th Annual Technical Conference of the SPE*, Oct. 8-11, 1989, pp. 595-609.

D. M. Grubert, "Evolution of a Hybrid Frac-Gravel Pack Completion: Monopod Platform, Trading Bay Field, Cook Inlet, Alaska," paper SPE 19401, *SPE Formation Damage Control Symposium*, Feb. 22-23, 1990, pp. 21-28.

M. Y. Soliman, et al., "General Minifrac Analysis for Heterogeneous Formation Including Spurt Loss," paper SPE 20705, *65th Annual Technical Conference and Exhibition of the SPE*, Sep. 23-26, 1990, pp. 855-866.

C. M. Pearson, et al., "Optimal Fracture Stimulation of a Moderate Permeability Reservoir, Kuparuk River Unit," paper SPE 20707, *65th Annual Technical Confer-*

(List continued on next page.)

*Primary Examiner*—George A. Suchfield
*Attorney, Agent, or Firm*—Rosenblatt & Associates

[57] ABSTRACT

A two-fluid method for fracturing a subterranean formation to increase the production of fluids from a well therein has been discovered. In a typical operation, a fluid pad is injected into the well which essentially simultaneously fractures the formation and forms a low permeability filter cake on at least part of the fracture. A proppant transport fluid containing proppant is then injected to prop open the fracture once the pressure is decreased. The filter cake is removed to permit production to begin. Although many conventional fluids may be used for the fluid pad, one preferred fluid pad uses graded calcium carbonate particle sizes and a modified lignosulfonate as a filter control agent. Optionally, a thixotropic polymer may be present as a viscosifier.

28 Claims, 3 Drawing Sheets

OTHER PUBLICATIONS

*ence and Exhibiton of the SPE,* Sep. 23–26, 1990, pp. 879–888.

D. C. Cramer, et al., "Batch–Mix Fracturing: An Effective Method of Stimulating Moderate–Permability Reservoirs," *SPE Production Engineer-ing,* Nov. 1990, pp. 461–468.

J. Thompson, et al., "Optimize Fracture Conductvity With Breaker Technology; Part 2–How Fracture Conductivity Affects Production," *Petroleum Engineer International,* Nov. 1990, pp. 44–55.

R. D. Barree, "A New Look at Fracture–Tip Screenout Behavoir," *JPT,* Feb., 1991, pp. 138–143.

S. J. Carnell, "Appraisal and Development of the Murta Reservoir Using Hydraulic Fracture Stimulation," paper SPE 22977, *SPE Asia–Pacific Conference,* Nov. 4–7, 1991, pp. 289–297.

M. H. Johnson, et al., "The Effects of Erosion Velocity on Filter–Cake Stability during Gravel Placement of Openhole Horizontal Gravel-Pack Completions," paper SPE 23773, *SPE Intl. Symposium on Formation Damage Control,* Feb. 26–27, 1992, pp. 73–83.

B. W. Hainey, et al., "Frac-Pack: An Innovative Stimulation and Sand Control Technique", paper SPE 23777, *SPE Intl. Symposium on Formation Damage Control,* Feb. 26–27, 1992, pp. 103–111.

J. A. Ayoub, et al., "Hydraulic Fracturing of Soft Formations in the Gulf Coast," paper SPE 23805, *SPE Intl. Symposium on Formation Damage Control,* Feb. 26–27, 1992.

F. L. Monus, et al., "Fracturing Unconsolidated Sand Formations Off-shore Gulf of Mexico," paper SPE 24844, *Annual Technical Conference and Exhibition,* Oct. 6–7, 1992.

METHOD OF PROPAGATING A HYDRAULIC FRACTURE USING FLUID LOSS CONTROL PARTICULATES

FIELD OF THE INVENTION

The invention relates to hydraulic fracturing methods using fluid systems for controlling fluid losses and hydraulic horsepower requirements, and more particularly relates, in one aspect, to multi-fluid methods which form a durable, thin filter cake to assist in intentional screen-out during fracturing, but which is easy to remove and results in little damage to the permeability of the formation or the conductivity of the propped fracture.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

Hydraulic fracturing has been a successful method of stimulating production from low-permeability hard rock formations. These techniques have proven to be extremely effective in improving hydrocarbon recovery rates making otherwise unprofitable reservoirs an economic success. Fracturing of soft formations requires a slightly different approach, although the techniques are basically the same. Soft formations, such as slightly consolidated or nonconsolidated sandstones, can be fractured and filled with proppant. However, as the fracture closes, the proppant becomes embedded or absorbed by the soft rock matrix. To avoid this problem, the fracture in soft formations should be as wide as possible. One effective method for obtaining a wide fracture is tip screenout (TSO) fracturing, described by M. B. Smith, et al., "Tip Screenout Fracturing: A Technique for Soft, Unstable Formations," *SPE Production Engineering*, May 1987, pp. 95-103. The tip screenout fracturing technique is also described in J. A. Ayoub, et al., "Hydraulic Fracturing of Soft Formations in the Gulf Coast," *Formation Damage Control Symposium*, SPE 23805, Lafayette, La., Feb. 26-27, 1992. A screenout in hard rock fracturing is normally avoided. A screenout means the proppant has bridged in the fracture preventing proppant from being transported farther down the fracture. In hard rock formations, the horsepower requirements to transport additional proppant into the fracture after a screenout can be extremely high. Also, the pressures at screenout may exceed safe operating limits and prematurely end the fracture treatment. In soft formations, the screenout pressure increases more slowly. The pressure increase after screenout causes the fracture width to increase. As the fracture width increases, additional proppant is placed into the wider fracture. The wider, propped fracture reduces the problem of embedment when the fracture closes.

The tip screenout fracturing technique is currently being applied to high permeability soft sandstone formations which may have normally been perforated and gravel packed. Many gravel packed formations have lower than predicted production rates due to near wellbore formation damage. The damage may be the result of mechanical stresses applied during drilling, drilling mud invasion, organic deposition, fluid incompatibility and perforating debris which can be trapped by the gravel pack. The damage may be difficult or impossible to remove by acid stimulation. The objective of these fracturing stimulations is to create a fracture deep enough into the formation to bypass the damaged zone and wide enough to maintain a high permeability pathway into the wellbore after the fracturing pressures and pump rates are removed. Also, if the fracture has a large enough area, the velocities and pressure drops of the produced fluids entering the fracture may be low enough to prevent formation particle migration and may reduce the problems of organic deposition by the produced fluids. Additionally, if the velocity and pressure drops are low enough, sand production may be eliminated. Reservoirs with laminated sand/shale sequences can be fractured to improve formation conductivity to the wellbore.

The tip screenout method is essential for soft sandstone formations to obtain a fracture width which will overcome embedment problems after the fracture is created and filled with proppant. Tip screenouts are currently designed based on log measurements and relatively low volume pump-in tests. The information is used to define fracture geometry, closure pressures, and leak-off coefficients for the fracturing fluids. Generally, as described in the Ayoub, et al. SPE 23805 paper, the same fluid is used to open the fracture, transport the propping agent, and distribute the proppant in the fracture. Much of the time these fluids and design techniques are adequate for obtaining a tip screenout fracture design. However, soft sandstone formations are rarely found in nature to be very uniform. Wells drilled into the same reservoir at different locations can yield widely different permeabilities, porosities, sand thicknesses and mineralogies. This means the short pump-in tests and log measurements may not adequately describe the reservoir other than the near wellbore region. If this occurs, a tip screenout may not be achieved and an adequate fracture width may not be obtained.

Fracture growth occurs out, up, and down until a barrier is reached where the treating pressures cannot fracture the barrier. Generally, the barrier may be a shale or other high strength rock or a higher stressed zone. As the fracture grows, the surface area of the fracture wall increases, resulting in increased leak-off to the formation. Assuming pressures are maintained high enough to create a fracture, the pump rate or volume controls the fracture extent. For example, if the fluid is pumped in at 10 bbls/min. and the area of the fracture face is allowing 10 bbls/min. leak-off, no additional fracture growth can be attained. The TSO occurs when the velocity of the proppant transport fluid is no longer high enough to transport the proppant farther into the fracture or the fracture width is not wide enough to allow the proppant to penetrate deeper into the fracture. If the screenout occurs too soon the fracture may not have a deep enough penetration of the formation to bypass damage and/or reduce flow velocities. If the screenout occurs too late, there may not be adequate proppant remaining to generate the necessary fracture width.

It would thus be desirable if a method were discovered which would permit the tip screenout technique to be used across a wide range of permeabilities and heterogeneities in the formation. Such a method would enhance the chances for success of TSO design and reduce the possibility that the design would fail due to the expected but unpredictable variations in permeabilities, porosities and mineralogies.

SUMMARY OF THE INVENTION

Accordingly, it is an object of the present invention to provide an improved method for fracturing a formation of slightly consolidated or nonconsolidated sandstone.

It is another object of the present invention to provide a method for fracturing a subterranean permeable formation which will compensate for a wide range of permeabilities and heterogeneities in the formation which are difficult to predict with precision.

It is yet another object of the invention to provide a method for enhancing fracturing techniques that may be readily implemented using existing equipment.

In carrying out these and other objects of the invention, there is provided, in one form, a method for hydraulically fracturing and propping a subterranean formation to increase the production of fluids from a well therein by using at least two steps. A fluid pad is injected into the well, where the fluid pad has a first fluid loss coefficient, at a pressure sufficient to fracture the formation. A proppant transport fluid is injected into the well, where the proppant transport fluid has a second fluid loss coefficient higher than the first fluid loss coefficient to intentionally induce a tip screen out during proppant injection. The verb "fracture" is used herein to include the propagation of any existing fracture or fractures and the creation of any new fracture or fractures.

DETAILED DESCRIPTION OF THE INVENTION

Figure 1:
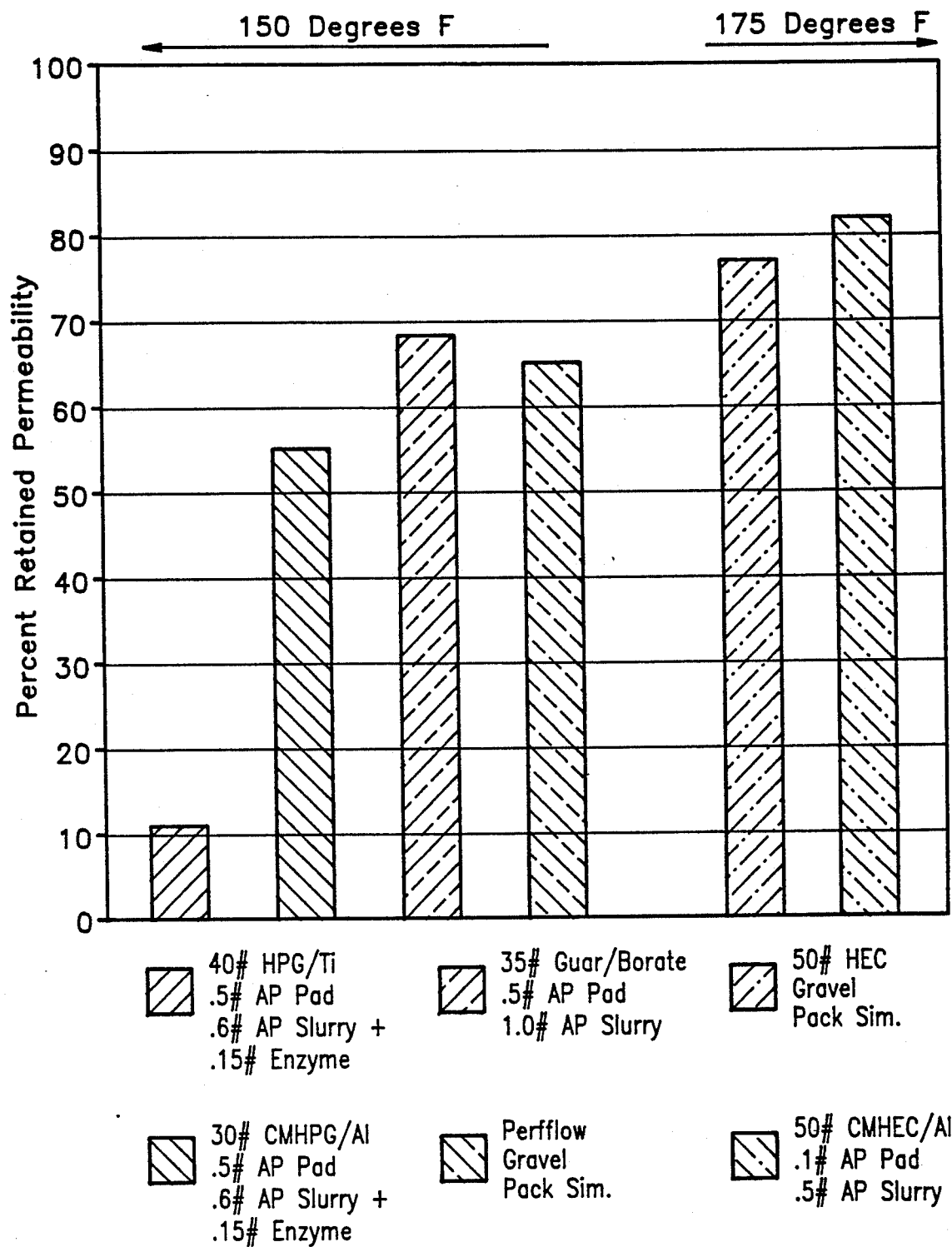
FIG. 1 is a summary of the % retained permeability of fracture proppant exposed to the fluid pad of Example 5 as compared to various other systems; 2 lb/ft$^2$ proppant loadings between Berea sandstone faces.

It has been discovered that the problems of soft sandstone heterogeneity may be overcome by a method of using two separate fluids for the fracturing operation. One of the fluids is a fluid pad. Most importantly, the fluid pad will have a fluid loss control particulate, also called a wall-building solid particulate, such as a graded salt, calcium carbonate or silica, as will be further explained. The fluid pad may also optionally consist of, as necessary, a polymer, mineral or surfactant fluid viscosifier and a filtration control additive such as lignosulfonate, starch or polyacrylate polymers, as will be more fully described later. Fluids currently being used for horizontal drilling applications or loss circulation materials, such as Baker Sand Control's PERFFLOW ™, Texas Brinadd Company's salt systems, mixed metal hydroxide drilling muds, and the like may be used for the fluid pad. The other fluid is a proppant transport fluid. The proppant transport fluid may contain a polymer or surfactant viscosifier, a friction reducing additive, modifiers to enhance leak-off to the formation being fractured or completion fluids without additives. While these components may be considered optional under some circumstances, the proppant transport fluid must, of course, deliver a proppant to the fracture.

The fluid pad will be used to initiate or extend the fracture. Because the fluid pads are designed to minimize fluid losses and build filter cakes over a wide range of permeabilities, heterogeneities in the formation should not affect fracture growth. Also, the low fluid leak-off through the filter cake reduces pump rate and horsepower requirements. The volume of fluid pad pumped is related to the desired fracture penetration or volume. In one embodiment of the invention, after the desired fracture penetration or volume is attained using the fluid pad, the proppant transport fluid is pumped. The proppant transport fluid is normally designed to leak-off readily and rapidly to the formation; this allows the fracture growth to be stopped and the proppant to screenout near the extent of the previously created fracture. However, in this invention continued pumping of proppant into the fracture following screenout should widen the fracture as the proppant transport fluid cannot leak-off effectively through the filter cake built on the fracture face by the fluid pad. After placement of the proppant, the solid particulates in the filter cake may be at least partially removed, such as by dissolution in a suitable solvent, or, if properly sized, allowed to flow back through the packed proppant after fracture closure. This method ensures a tip screenout fracture despite reservoir heterogeneities. While it is generally understood that the method of this invention will find its greatest use in at least partially unconsolidated subterranean formations or "soft" rock formations having an unconfined Young's modulus of less than about 1,000,000 psi, it is also anticipated that the method will find utility in hard rock formations as well.

Fluid Pad

Materials useful for a fluid pad are sometimes known as a "low damage potential drilling fluids" or a lost circulation materials known as an LCMs. In the past, these fluids have only been used for forming filter cakes within the wellbore. If the well is cemented in, the filter cake may be placed inside the casing, outside the casing, or both. These fluids generally consist of polymers, viscosity enhancers and soluble particles for building a filter cake. The particles are the most important and required feature and are usually graded salt, silica or mixtures of the two. The graded salt may include, but is not necessarily limited to, potassium chloride (KCl); sodium chloride (NaCl); calcium chloride; magnesium chloride; sodium sulfate; sodium carbonate; calcium carbonate (CaCO$_3$); sodium bicarbonate; sodium bromide; potassium bromide; potassium carbonate and mixtures thereof. Metal hydroxides may also be used in some instances. The fluid pad is generally distinguished by having unusually high solids contents, from about 12 to about 35%, preferably from about 17 to about 19%. These compounds are used because they are soluble in undersaturated brines or hydrochloric acids. One problem with prior art filter cakes is that they are often difficult to remove requiring high pressures to do so. Under such conditions, damage results to the formation. Such damage is believed to occur because the filter cake invades the formation and becomes "cemented" thereto and must be forcibly removed at high pressure; the forceful removal is thought to cause damage to the permeability of the formation.

As noted, problems arise in designing these fluids for forming wellbore filter cakes because production zones vary in pressure, permeability, porosity and formation configuration. Generally, fluids used to control fluid leak-off in permeable formations require an initial high pressure spike before removal can begin, from about 300 to 500 psi. This pressure spike is indicative of damage to the original permeability of the permeable formation. It is necessary that the fluid pad easily form a relatively impermeable filter cake on at least part of the fracture surface to prevent or at least substantially reduce the leak-off of the proppant transport fluid. The filter cake formed by the fluid pad expands the tip screenout technique by reducing the effects of formation heterogeneities. At the same time, however, it is also highly desirable for the filter cake to be easily removable at the beginning of production causing little or no damage to the formation.

In one non-limiting embodiment of the invention, a fluid pad of choice uses graded calcium carbonate particle sizes, a modified lignosulfonate (lignin sulfonate) and water, and optionally a thixotropic polymer such as a welan gum polymer. This fluid pad has unique properties for controlling fluid losses into permeable formations. The excellent fluid leak-off control is apparently due to the fluid's unique filter cake properties. The fluid forms a very durable, thin cake that acts like a check valve on the permeable formation. Surprisingly, the fluid of this invention exhibits little or no removal pressure spike, even when placed at high differential pressures sufficient to fracture the formation. Testing has indicated the filter cake from such a fluid pad is easy to remove and yields very low or minimal damage to the original permeability of the permeable formation.

The essential cake-building solid particulate may be selected from a wide variety of materials including, but not limited to, graded salt, silica, clays (e.g. montmorillonite, bentonite, attapulgite, etc.), oil soluble particulates, particulates which degrade with time and/or temperature, and mixtures thereof, where the salt of the graded salt is selected from the group consisting of potassium chloride; sodium chloride; calcium chloride; magnesium chloride; sodium sulfate; sodium carbonate; calcium carbonate; sodium bicarbonate; sodium bromide; potassium bromide; potassium carbonate and mixtures thereof. Metal hydroxides may also be used as the particulate. Suitable viscosifiers which may be used in the fluid pad include, but are not limited to, water soluble cellulose ethers, such as hydroxyethyl cellulose (HEC); biopolymers (e.g. welan gum polymers; guar gum polymers; xanthan gum derivatives); clays; surfactant polymers and any other thixotropic polymer having gel strength. Filter control additives may also be present in the fluid pad. Suitable filter control additives include, but are not limited to, lignosulfonate; metal lignosulfonate; modified lignosulfonate; starch; polyacrylate polymers; silica flour; clays; and mixtures thereof.

In another embodiment of the invention, the fluid pads of this invention may have two main components: (1) a graded calcium carbonate and (2) a modified lignosulfonate, in addition to water making up the balance of the fluid. In a broad embodiment of the invention, the proportions of the various components range from about 70 to 90 wt. % water; from about 10–30 wt. % graded calcium carbonate particles and from about 2 to 5 wt. % of the modified lignosulfonate. In another aspect of the invention, the components range from about 73 to 83 wt. % water; about 13 to 24 wt. % graded calcium carbonate particle sizes; and from about 3 to about 4 wt. % modified lignosulfonate. In another embodiment, the proportions range from about 78 to 83 wt. % water; about 13 to 18 wt. % blend of graded calcium carbonate particle sizes; and from about 3 to about 4 wt. % modified lignosulfonate. Most preferably, the proportions of the fluid components range from about 82 to 83 wt. % water; about 13 to 14 wt. % blend of graded calcium carbonate particle sizes; and from about 3 to about 4 wt. % modified lignosulfonate. It most commercial embodiments of the inventive fluids, it will be very desirable to include a viscosifier, such as a thixotropic polymer mentioned above, to keep the particles and the modified lignosulfonates in suspension. The proportions of the thixotropic polymer may range in one aspect from about 0.25 to 1.25 wt. %, more preferably from about 0.31 to about 0.35 wt. %, most preferably from about 0.34 wt. % to about 0.35 wt. %. Other ingredients may be present in the fluid system as long as they do not adversely affect the performance of the system.

In another embodiment of the invention, the particulates are preferably graded so that their size distribution will be relatively broad or wide and result in a thin filter cake of extremely low permeability, and so that minimal invasion of particles and filtrate will occur when the filter cake forms on the fracture surface. It will thus be appreciated that while the exact particulate grading for a particular fluid pad will depend on the permeability characteristics of the formation, if the size distribution is sufficiently broad, the fluid pad, and the filter cake formed will account for the variations in permeability. Generally, by the term "graded" it is meant that the calcium carbonate particles have a certain defined size distribution. It has been discovered in the inventive fluid pads that the graded particulate should have a relatively wide, rather than a narrow distribution of size. That is, the particles should not have too much of any one size in the proportion used in the fluid. For example, Milpark Drilling Fluids "W.O. 30C" calcium carbonate (coarse) product has about 100% of its particles less than 200 microns in diameter but only about 40% of its particles less than 100 microns indicating most of the particles are between 100 and 200 microns which may be too narrow a distribution for most applications of the inventive fluids. (The products mentioned happen to be calcium carbonates, by way of illustration only, and are not meant to limit the invention to these specific particulates.) A product such as Baroid's "M-50" calcium carbonate which has a more diverse distribution of sizes, for example, 100% less than 200$\mu$, 80% less than 75$\mu$, 60% less than 40$\mu$, 40% less than 25$\mu$ and 20% less than 8$\mu$. It will be appreciated that even if a particular grade of particulate is too narrow for this fluid, that by blending two or more grades of particulate that a particle size distribution may be obtained which is suitable. For example, if Baroid's "M-50" calcium carbonate grade is acceptable, such distribution may be approximated by blends of other products, e.g. 50% of Huber's "M-50" and "Q-200" calcium carbonate products or even a 66% "M-50" calcium carbonate and 33% "Q-200" calcium carbonate blend. Examples of commercially available graded calcium carbonate which may be useful in this invention either alone or as blends include, but are not limited to "W.O. 30F", "W.O. 30C" and "SRP-0197" calcium carbonates sold by Milpark Drilling Fluids; "M-3", "M-4", "M-6", "M-50", "M-200", "M-300", "Q-60", "Q-100", "Q-200" calcium carbonates sold by J. M. Huber Corp. "BARACARB" sized $CaCO_3$ sold by Baroid as well as "M-5" and "M-50" calcium carbonate; and all made by Metsa-Serla. The material sold as "Q-200" callcium carbonate by Huber and designated "SRP-0197" calcium carbonate by Milpark Drilling Fluids, which is believed to be the same material, is particularly preferred in some embodiments as it has performed well in experimental formulations. Its size distribution is given in Table IX, infra. The particulate size distribution of the fluid system of this invention may thus be one which is close to or approximates this material, but, as mentioned, does not have to be and should be selected for a particular formation. In one aspect of the invention, it has a distribution of the following Table A.

TABLE A

| $CaCO_3$ Particle Size Distribution | |
|---|---|
| Particle Size (microns) | Percent Smaller Than Given Size, But Larger Than Next Size |
| 128 | 0 |
| 96 | 6.1–7.5 |
| 64 | 6.1–7.5 |
| 48 | 18.3–22.3 |
| 32 | 11.2–13.6 |
| 24 | 9.4–11.4 |
| 16 | 6.6–8.0 |
| 12 | 6.5–7.9 |
| 8 | 5.6–6.8 |
| 6 | 5.2–6.4 |
| 4 | 3.5–4.3 |
| 3 | 2.6–3.2 |
| 2 | 2.5–3.1 |
| 1.5 | 1.1–1.3 |
| 1 | 5.4–6.6 |

It is believed, without being limited to any one theory, that too narrow a distribution provides too many of the same size of particle which therefore tend to stack like marbles with interstices or spaces between the relatively uniform particles which permit fluid flow therethrough. By using a distribution of various sizes, the gaps between the larger particles are filled by the succeedingly smaller particles. Permeability and porosity are a function of the grain size and distribution of the particles making up the formation. Using one non-limiting example, if the average grain size of the particular formation is x, then the size of the particles used as the filter media in the filter cake might be x/6 or some other formula. However, as explained above, not all of the filter media particles should be x/6, but they should be distributed or graded about the x/6 point. For example, x/2 fluid particles would "bridge" across the spaces between the x grains of the formation. In turn, x/3 particles would bridge between the x/2, which in turn would be bridged by the x/4 particles and so forth (to and beyond less than x/6, to x/7, etc.) until complete blockage occurs. While this is an oversimplified illustration, it does explain why a fluid having a wide or graded distribution of calcium carbonate particle sizes forms a more impermeable filter cake than one with a more narrow distribution and uniform particle size. However, a suitable filter cake of low permeability could be obtained with a narrow distribution of uniform particles, but it is also apparent that it is not possible to specify in advance the exact size distribution of the particles in any given fluid, since the distribution depends on the average grain size of the formation where the fluid is to be used.

Modified lignosulfonates can be important to the fluid pads. The lignosulfonates are modified by polymerizing them at least to the extent that their water solubility is decreased from that which they would normally have. This decrease in water solubility may occur just by increasing the molecular weight of the lignosulfonates, although the inventors do not wish to be bound by any one theory. These suitable materials may also be described as polyelectrolyte modified lignosulfonates which are anionic polymers with cross-linked sulfonate radicals. "FILTREX"; modified lignosulfonate sold by Milpark Drilling Fluids is described as a polyelectrolyte modified leonardite-based natural polymer. It is believed that the sulfonate functional groups are cross-linked with sugars, although it is within the scope of this invention to use other cross-linking agents. Cross-linked fluids may be used. However, the fluid pad is generally not cross-linked. The viscosities of fluids which are cross-linked tend to change with temperature more than desirable. While the viscosities of the preferred fluid pads herein do change with temperature, they do not change as much as those of cross-linked fluids.

One non-limiting hypothesis about how the fluid pad works involves the modified lignosulfonates (or other filter control additive) coating or encapsulating the particulates with a thin shell which somehow acts as an elastic medium connecting the particles together in a "loose" way that covers and essentially protects and "seals" the surfaces of the fracture, without invading or penetrating into the formation. The filter cake thus built up is durable during fracturing and proppant placement but may be easily removed at the beginning of the hydrocarbon recovery phase with little or no pressure spike. The lack of pressure spike is believed to be due to the fact that the filter cake does not invade the formation nor form a cake which is too highly connected and rigid and which smoothly peels away particle by particle, rather than sporadically in lumps or masses. For example, the filter cakes from the fluid system of this invention may be removed at pressures equal to or less than 50 psi.

It has been demonstrated for radial flow that the effects of "skin damage" (very shallow permeability damage into the formation from the well bore) on estimated production can be very minimal. If permeability is reduced by 50% in 0.1–0.4 ft invasion from the well bore, the overall effect on production is minor, a reduction of less than 10% occurs. On the other hand, if damage to the formation continues reducing the permeability deeper (e.g. up to 10 ft into the formation), production can be lowered by 26%. Thus, a filter cake must be used which does not invade far into the formation.

In still another embodiment of the invention, the fluid pad provides a filter cake which does not have to be removed from the wall of the fracture before proppant placement. If properly sized, the majority of the filter cake particles will pass back through the packed proppant. Commercially available products which are non-soluble in an appropriate solvent would require removal of the filter cake prior to placement of the proppant because cake removal would damage the formation and/or the cake material will not pass back through the packed proppant. All non-soluble products of this nature on the market are damaging and will not return through the pack. That is, the majority of the particles of the filter cake in this embodiment will easily pass through the sand or other material used to prop apart the fractures in the formation. The ability of the filter cake to pass through the proppant is further evidence that it may break up one particle at a time, rather than in masses or clumps.

Alternatively, the filter cake may be made up of particles which are relatively soluble in a particular media which is injected into the fractures and pumped back through the proppant to remove the cake. For example, particulates soluble in acids may be employed. In still another alternate method of removing the filter cake, the cake may be removed by changing its state. For example, if polyglycolic acid (PGA) were used as the filter cake solid, it could be converted to a liquid by degradation at the appropriate temperature. Degradation includes converting the filter cake solid to particulates small enough to be solubilized. All of these filter cake removal methods involve somehow "converting it to a liquid" for removal, and thus this phrase is used generically herein to encompass all possible removal methods including those not specifically mentioned.

Proppant Transport Fluid

The fluid pad described above will have a fluid loss coefficient, termed a "first" fluid loss coefficient since the pad is generally, though not always, injected first. The proppant transport fluid will have a second fluid loss coefficient which should be higher than the first fluid loss coefficient of the fluid pad. In one embodiment of the invention, the proppant transport fluid's second fluid loss coefficient is a minimum of two times greater than the first fluid loss coefficient of the fluid pad. However, it should be recognized that because of the presence of the thin filter cake created on the fracture walls by the fluid pad, the actual fluid leak-off of the proppant transport fluid will be minimal or negligible on the fracture walls. Determining the fluid loss coefficients of the fluids is well known in the art. For example, see J. L. Gidley, et al., ed., Recent Advances in Hydraulic Fracturing, G. S. Penney, et al., Chapter 8, "Fluid Leakoff", SPE, Richardson, Tex., 1989, pp. 147–176, incorporated by reference herein, among others.

The proppant may include, but is not limited to, materials such as sand; silica; ceramic; resin-coated particles; bauxite; and mixtures thereof. It is expected that the fluid media for transporting the proppant be water, although any suitable, common drilling or completion fluid may be employed. It may also be desirable to include a viscosifier in the proppant transport fluid. Suitable viscosifiers were mentioned above with respect to the fluid pad. In general, the proppant transport fluid may be any of those commonly used now or in the future.

The invention will now be further described by the use of the following non-limiting Examples which are merely illustrative without being restrictive.

EXAMPLES 1 AND 2

A preferred fluid pad of this invention (Example 1) and one of more conventional formulation (Example 2) used for wellbore filter cakes were assembled as described in Table I.

TABLE I

Compositions of Fluid Loss Systems

| Component | (Inventive) Example 1 | (Comparative) Example 2 |
|---|---|---|
| Water, cc | 317 | 317 |
| "BIOZAN" water soluble polymer, g | 1.36 | 1.36 |
| "SRP-0197 graded $CaCO_3$, g" | 50 | — |
| "W.O. 30 C graded $CaCO_3$, g" | — | 25 |
| "W.O. 30 F graded $CaCO_3$, g" | — | 25 |
| "DICALITE 104 synthetic silicon" | — | 25 |
| "FILTREX" modified lignosulfonate, g | 15 | 15 |
| KCl 4%, g | 12.9 | 12.9 |

For both Examples, the HPHT (high pressure, high temperature) dynamic filtration unit testing parameters were maintained at 300 rpm, 500 psi and 250° F. Dynamic filtration results are as shown in Table II.

TABLE II

Dynamic Filtration Results: Examples 1 and 2

| Example 1 | | | | | | | | | | | | | | |
|---|---|---|---|---|---|---|---|---|---|---|---|---|---|---|
| Minutes | 1 | 2 | 3 | 4 | 5 | 6 | 7 | 8 | 9 | 10 | 15 | 20 | 25 | 30 |
| Cumulative Filtrate | 4 | 5 | 5.6 | 6 | 6.4 | 7 | 7.2 | 7.5 | 7.8 | 8 | 9.2 | 10 | 10.8 | 11.4 |
| ×2 | 8 | 10 | 11.2 | 12 | 12.4 | 14 | 14.8 | 15 | 15.6 | 16 | 18.4 | 20 | 21.6 | 22.8 |
| Cake Thickness (mm) | 1.0 | | | | | | | | | | | | | |
| Example 2 | | | | | | | | | | | | | | |
| Minutes | 1 | 2 | 3 | 4 | 5 | 6 | 7 | 8 | 9 | 10 | 15 | 20 | 25 | 30 |
| Cumulative Filtrate | 2.1 | 3.5 | 4.7 | 5.7 | 6.6 | 6.9 | 7.5 | 8.1 | 8.6 | 9.1 | 11.1 | 12.7 | 14.2 | 15.3 |
| ×2 | 4.2 | 7.0 | 9.4 | 11.4 | 13.2 | 13.8 | 15.0 | 16.2 | 17.2 | 18.2 | 22.2 | 25.4 | 28.4 | 30.6 |
| Cake Thickness (mm) | 2 | | | | | | | | | | | | | |

Return permeability analysis was done with high permeability Berea Sandstone. "LVT-200" synthetic oil was used for simulation of oil. Return permeability was determined to be 90% for the Example 1 fluid and 60 for the Example 2 fluid. It is apparent that the inventive fluid of Example 1 had better fluid loss control (22.8 v. 30.6 at 30 minutes) and better return permeability (90% v. 60%). Both of these properties need to be good for the fluid pad to form a filter cake with necessary characteristics.

EXAMPLE 3

Fluid pads tested in this Example were two different calcium carbonate fluids with different particle size distributions and a graded salt drilling fluid. The fluid pad FPA of this invention was a graded calcium carbonate fluid recommended for use in the wellbores of reservoirs from 60 millidarcies (md) to 5000 md of permeability. This fluid consisted of water soluble polymers, complex modified lignosulfonates and the graded calcium carbonate.

The fluid pad FPB is a comparative fluid having a calcium carbonate system similar to that of FPA except that the particle size distribution was custom sized for 3000 md of reservoir permeability and was not as widely distributed over as many sizes as that of FPA. The fluid pad FPC was a graded salt (NaCl) system containing a xanthan derivative polymer and an organic starch to enhance fluid loss properties of the fluid.

Flow Test Description

A flow test apparatus was constructed so that a $CaCO_3$ or NaCl particle filter cake could be placed inside a 3 in. (76 mm) I.D. porous aluminum oxide tube. This porous tube was attached to 3 in. (76 mm) I.D. PVC tubes (above and below the porous tube) and placed inside a 6 in. (150 mm) transparent, methylacrylate tube with flanges on each end. The total length of the inner concentric tubing string was 7 ft. (2.0 m). A centrifugal pump was manifolded to the test vessel, such that fluid could be circulated through the inner string or displaced through the concentric tubing annulus (formed by the inner string and the methylacrylate tube), through the porous tube (from outside to inside) and out through the inner tube. Pressure transducers were placed at the inlets and outlets of the inner tube and the concentric annulus. The pressure differential across the inlet and outlet of the inner tube was also monitored. A flow meter was also used on the discharge of the centrifugal pump so that all flow rates could be accurately monitored. All data was collected by a dedicated computer for each test performed and fluid losses from the inner tube were manually measured.

Test Procedures

Before performance of the actual flow tests, the "system pressure drop" was determined so that friction pressures would not be included in permeability calculations. The system pressure drop was determined by replacing the porous aluminum oxide tube with a perforated tube having the same dimensions of the porous tube. Fluid was injected through the concentric annulus, through the perforated tube and out of the apparatus through the 3 in. (76 mm) tube located below the perforated tube. The recorded pressure drops were, essentially, due to friction pressure and this friction pressure was termed the "system pressure drop".

The test procedure used for each completion fluid with the three different fluid pads is outlined below.

1. The test apparatus was filled with filtered tap water and the initial permeability of the porous tube was established by circulating filtered fluid through the annulus and porous tube. The pressure drop across the porous tub (from outside to inside) was calculated by subtracting the "system pressure drop" from the observed pressure drop. This method eliminated friction pressure from the calculation. Darcy's radial flow equation was used, with the corrected pressure drop to calculate the porous tube's permeability.

2. The filter cake was placed on the inside of the porous tube by circulating the appropriate fluid pad through the inner tubing string at 1.5 BPM (barrels per min.; 0.2 $m^3$/min.) while allowing leak off through the porous tub to the annulus. After 10 minutes, the circulation rate was increased to 4.5 BPM (0.7 $m^3$/min.) and circulated at this rate for 10 minutes. Pressure drop between tubing and annulus was 50-60 psig (350 to 420 kPa).

3. The circulation rate was decreased to 1BPM (0.16 $m^3$/min.) and the completion fluid was circulated for 10 minutes at this rate. Visual observations could be made through the transparent methylacrylate outer tube to see if the completion fluid was leaking off through the filter cake. In addition to visual observations, the valve on the annulus was left open so that the leak off rate could be measured.

4. After 10 minutes of circulation, the circulating rate was incremented to 2 BPM (0.3 $m^3$/min.) and maintained for 10 minutes.

5. The circulation rate was then incremented to 3.0 BPM (0.5 $m^3$/min.) and held at this rate for 20 minutes. Fluid loss rates were monitored throughout the test.

6. While circulating at 3 BPM (0.5 $m^3$/min.), 1 lbm/U.S. gal (120 kg/$m^3$) of 40-60 sand, was added to the completion fluid and continued at this rate for another 20 minutes. During all circulation tests the pressure difference between the inside and outside of the porous tube was maintained at 50 to 60 psig (350 to 420 kPa) by application of back pressure.

7. After the circulation tests were completed (steps 1. through 6.) the final permeability of the porous tube was measured by circulating filtered tap water through the porous tube (from outside to inside) via the annular circulation path.

8. Darcy's radial flow equation was then applied to calculate the final permeability of the porous tube.

9. A ratio of final permeability to initial permeability was then calculated for each fluid tested.

Besides the three fluid pads FPA, FPB and FPC tested, three completion fluids, with and without 40-60 U.S. mesh sand were also tested. These fluids were: (1) filtered tap water (filtered, saturated NaCl brine for use with the graded salt fluid pad), (2) filtered tap water viscosified with 0.48% hydroxyethylcellulose (HEC) (filtered saturated NaCl brine viscosified with 0.48% HEC for the graded salt fluid pad), and (3) filtered tap water viscosified with 0.43% xanthan gum derivative (filtered, saturated NaCl brine viscosified with 0.43% xanthan gum derivative polymer for the graded salt fluid pad). When sand was added to the fluids, a concentration of 1 lbm/U.S. gal (120 kg/$m^3$) of 40-60 mesh sand per U.S. gallon of completion fluid was used. The sand slurries were tested because horizontal wells are sometimes gravel packed with these fluids. However, it should be noted that these fluids may also be used for proppant transport fluids during fracturing. The data attained from the flow tests is summarized in Tables III through V. Each Table reflects the test results of all six completion fluid tests with a specific fluid pad.

The porous tube permeabilities ranged from 3500 md to 6300 md, and the typical test pressures all ranged from 50-60 psig (350-420 kPa).

When the FPA and FPB fluid pads were tested, the filter cakes exhibited very little change with respect to fluid loss. The fluid loss rate appeared to be independent of completion fluid circulation rate with the exception of the water and sand slurry. When the sand was added to the water and this slurry was initially circulated across the filter cake, an initial increase in fluid loss was observed. However, as circulation time increased, the fluid loss rate again decreased to a level that was slightly greater than that of the water without sand. It should be noted that the fluid losses were much greater with FPC. This shows the importance of considering using the complex, modified lignosulfonates preferred in this invention to provide a filter cake on the fracture face with excellent fluid loss prevention characteristics.

TABLE III

Well Simulator Flow Test Results - Fluid Pad A (FPA)
Porous Tube I.D. = 3"; L = 2 ft.

| | | | |
|---|---|---|---|
| Initial Permeability, $K_i$, md | 3534 | 4725 | 6304 |
| Placement of Filter Cake | | | |
| Fluid Pad Circulation loss | | | |
| Filtrate Rate at | | | |
| 1.5 BPM, cc/min. | | | |
| 1 min | 28 | 28 | 44 |
| 3 min | 18 | 22 | 34 |
| 6 min | 16 | 18 | 30 |
| 9 min | 14 | 17 | 30 |
| Filtrate Rate at | | | |
| 4.5 BPM, cc/min. | | | |
| 1 min | 12 | 14 | 32 |
| 3 min | 12 | 14 | 18 |
| 6 min | 12 | 14 | 16 |
| 9 min | 12 | 14 | 16 |
| Completion Fluid Type | Water | 0.43% XC | 0.48% HEC |
| Completion Fluid Circulation Loss | | | |
| Fluid Loss at 1 BPM, cc/min. | | | |
| 1 min | 48 | 12 | |
| 3 min | 48 | 12 | 240 |
| 6 min | 38 | 12 | 116 |
| 9 min | 28 | 12 | 74 |
| Fluid Loss at 2 BPM, cc/min. | | | |
| 1 min | 24 | 12 | |
| 3 min | 24 | 12 | 36 |
| 6 min | 26 | 12 | 26 |
| 9 min | 26 | 12 | 22 |
| Fluid Loss at 3 BPM, cc/min. | | | |
| 1 min | 30 | 12 | 20 |
| 3 min | 31 | 12 | 18 |
| 6 min | 32 | 12 | 18 |
| 9 min | 32 | 10 | 12 |
| Gravel Slurry Circulation Loss | | | |
| Fluid Loss at 3 BPM, cc/min. | | | |
| 1 min | 220 | 10 | 12 |
| 5 min | 64 | 10 | 12 |
| 10 min | 52 | 12 | 12 |
| 20 min | 48 | 12 | 12 |
| Final Permeability, $K_f$, md | 3121 | 4243 | 4702 |
| Return Permeability Ratio, $K_f/K_i$ | 0.88 | 0.90 | 0.75 |

TABLE IV

Well Simulator Flow Test Results - Fluid Pad B (FPB)
Porous Tube I.D. = 3"; L = 2 ft.

| | | | |
|---|---|---|---|
| Initial Permeability, $K_i$, md | 3279 | 3260 | 3260 |
| Placement of Filter Cake | | | |
| Fluid Pad Circulation loss | | | |
| Filtrate Rate at | | | |
| 1.5 BPM, cc/min. | | | |
| 1 min | | | 36 |
| 3 min | 36 | 36 | 26 |
| 6 min | 32 | 30 | 24 |
| 9 min | 30 | 20 | 20 |
| Filtrate Rate at | | | |
| 4.5 BPM, cc/min. | | | |
| 1 min | 32 | 20 | 20 |
| 3 min | 32 | 20 | 20 |
| 6 min | 38 | 20 | 20 |
| 9 min | 38 | 20 | 20 |
| Completion Fluid Type | Water | 0.43% XC | 0.48% HEC |
| Completion Fluid Circulation Loss | | | |
| Fluid Loss at 1 BPM, cc/min. | | | |
| 1 min | 18 | 15 | 350 |
| 3 min | 10 | 18 | 350 |
| 6 min | 10 | 16 | 250 |
| 9 min | 18 | 16 | 170 |
| Fluid Loss at 2 BPM, cc/min. | | | |
| 1 min | 20 | 15 | 150 |
| 3 min | 26 | 14 | 122 |
| 6 min | 28 | 16 | 100 |
| 9 min | 28 | 15 | 90 |
| Fluid Loss at 3 BPM, cc/min. | | | |
| 1 min | 26 | 15 | 70 |
| 3 min | 28 | 15 | 58 |
| 6 min | 30 | 15 | 50 |
| 9 min | 32 | 14 | 36 |
| Gravel Slurry Circulation Loss | | | |
| Fluid Loss at 3 BPM, cc/min. | | | |
| 1 min | 98 | 26 | 32 |
| 5 min | 60 | 22 | 30 |
| 10 min | 48 | 22 | 28 |
| 20 min | 42 | 20 | 20 |
| Final Permeability, $K_f$, md | 3156 | 2921 | 2868 |
| Return Permeability Ratio, $K_f/K_i$ | 0.96 | 0.90 | 0.88 |

TABLE V

Well Simulator Flow Test Results - Fluid Pad C (FPC)
Porous Tube I.D. = 3"; L = 2 ft.

| | | | |
|---|---|---|---|
| Initial Permeability, $K_i$, md | 3141 | 2743 | 3164 |
| Placement of Filter Cake | | | |
| Fluid Pad Circulation loss | | | |
| Filtrate Rate at | | | |
| 1.5 BPM, cc/min. | | | |
| 1 min | 22 | 40 | 46 |
| 3 min | 20 | 26 | 38 |
| 6 min | 14 | 16 | 38 |
| 9 min | 14 | 14 | 38 |
| Filtrate Rate at | | | |
| 4.5 BPM, cc/min. | | | |
| 1 min | 10 | 14 | 38 |
| 3 min | 10 | 12 | 38 |
| 6 min | 10 | 12 | 38 |
| 9 min | 10 | 12 | 38 |
| Completion Fluid Type | NaCl | 0.43% XC | 0.48% HEC |
| Completion Fluid Circulation Loss | | | |
| Fluid Loss at 1 BPM, cc/min. | | | |
| 1 min | 1000 | | 1500 |
| 3 min | 950 | 200 | 1700 |
| 6 min | 280 | 112 | 3500 |
| 9 min | 82 | 34 | 3500 |
| Fluid Loss at 2 BPM, cc/min. | | | |
| 1 min | 96 | | 3200 |
| 3 min | 90 | 28 | 2700 |
| 6 min | 74 | 26 | 2400 |
| 9 min | 62 | 24 | 2200 |
| Fluid Loss at 3 BPM, cc/min. | | | |
| 1 min | 74 | 34 | 1800 |
| 3 min | 64 | 34 | 1600 |
| 6 min | 58 | 34 | 1400 |
| 9 min | 46 | 18 | 1100 |
| Gravel Slurry Circulation Loss | | | |
| Fluid Loss at 3 BPM, cc/min. | | | |
| 1 min | 188 | 30 | 1200 |
| 5 min | 56 | 30 | 1100 |
| 10 min | 32 | 18 | 1000 |
| 20 min | 24 | 16 | 800 |
| Final Permeability, $K_f$, md | 3071 | 2355 | 2641 |
| Return Permeability Ratio, $K_f/K_i$ | 0.98 | 0.85 | 0.83 |

Dynamic Filtration and Filter Cake Stability Test Procedure

Dynamic filtration tests were performed using FPA according to the following procedure. The test utilized a Dynamic HT-HP Filtration unit as described by Chesser, B. G., et al., "Dynamic and Static Filtrate Loss Techniques for Monitoring Filter Cake Quality Improves Drilling Performance," SPE 20439, 1990 *SPE Annual Technical Conference and Exhibition*, New Orleans, La., Sep. 23-26, 1990. The design and operating characteristics of this device were published in Chesser, B. G., "Dynamic Filtration of Drilling Fluid," *Advances in Filtration and Separation Technology, American Filtration Society*, Vol. 1, 1990, pp. 103–107. These details are incorporated by reference herein and thus will not be given here. The device consisted essentially of a high pressure filtration cell fitted with a motor driven shaft and propeller providing dynamic erosion of the cake. A three-bladed "tear-shaped" propeller with 1/16 in. clearance at the cell wall was utilized, providing a circulating action downward on the cake. This design tends to eliminate the highly variable shear rate from center to outer cell wall that is prevalent in a simple circular stirring motion.

The fluid pad and flushing fluid were prepared immediately before the test. The dynamic filtration test to form the filter cake with the fluid pad is as follows: First the fluid was filtered dynamically at 250° F. (120° C.), 500 psi (3500 kPa) and 300 rpm for 30 minutes, then static for 30 minutes, and finally dynamic at 600 rpm for 30 minutes. After forming the cake, the drilling fluid is removed from the cell and replaced with the solid free flush fluid to measure the effects of the flush fluid on the existing filter cake. The flush fluid ran at 600 rpm with 500 psi (3500 kPa) for one hour measuring the filtration every five minutes. This procedure represents forming a dynamic filter cake when the formation is fractured, then additional filtrations under static conditions such as tripping, or pump shut down, then returning to dynamic conditions at a higher annular velocity that might be encountered after a proppant transport fluid is run into the well bore. A flush fluid may be necessary to remove or displace the fluid pad before the proppant pack if the fracture treatment were interrupted for any reason.

The leakoff characteristics of both FPA and the typical proppant transport fluids observed in the flow test apparatus were similar to the dynamic filtration tests, performed at 250° F. (120° C.) and 500 psi (3500 kPa). Table VI displays the results of the dynamic filtration and filter cake stability tests. The results reflect no change in the thickness of the filter cake after it had been flushed with the completion fluids dynamically at 600 rpm for one hour. The dynamic filtration tests indicate that the filter cake remains stable at higher pressures and temperatures than could be predicted by flow tests.

Initial fluid losses for the HEC viscosified fluid were extremely high when compared to other fluids tested and this cannot be readily explained and did not correlated with dynamic filtration tests.

In summary, the filter cake particles for all fluid pads tested did not appear to be eroded by circulation of the completion fluids. However, when sand was added to the filtered water (or saturated brine) the initial fluid loss rate increased as the brine-sand slurry reached the filter cake. But as circulation was continued the fluid loss rates began to decrease. This phenomenon could be due to a partial erosion of some filter cake particles, initially, coupled with the deposition of sand particles on top of the remaining filter cake. Most of the filter cake particles, $CaCO_3$ and NaCl, were removed by subsequent back flow, i.e. flow from outside to inside of the porous tube.

TABLE VI

Dynamic Filtration and Cake Stability Test Results
Test Conditions: 250° F., 500 pis
Fluid Pad A (FPA)

TABLE VI-continued

Dynamic Filtration of Fluid Pad

| Time, minutes | | Filtration Volume, ml |
|---|---|---|
| 0 | | 0 |
| 1 | | 3.8 |
| 3 | | 4.8 |
| 5 | Dynamic | 6 |
| 10 | @ 300 rpm | 7.4 |
| 15 | | 8.4 |
| 20 | | 9.4 |
| 25 | | 10.2 |
| 30 | Cake 1 mm | 11 |
| 40 | Static | 0 |
| 50 | | 3.8 |
| 60 | Cake 1.5 mm | 4.8 |
| 70 | Dynamic | 7.4 |
| 80 | @ 600 rpm | 8.4 |
| 90 | Cake 1 mm | 9.4 |

Filter Cake Stability Test
Dynamic @ 600 rpm

| Time, minutes | Cumulative fluid loss, ml | | |
|---|---|---|---|
| Flush fluid type: | Water | 0.43% XC | 0.48% HEC |
| 0 | 0 | 0 | 0 |
| 5 | 6.6 | 0.4 | 0.6 |
| 10 | 8 | 1 | 0.8 |
| 15 | 8.6 | 1.6 | 1 |
| 20 | 9.4 | 2.2 | 1.1 |
| 25 | 10.2 | 3 | 1.3 |
| 30 | 11 | 3.6 | 1.7 |
| 35 | 11.8 | 4.2 | 2.2 |
| 40 | 13 | 5 | 2.7 |
| 45 | 14 | 5.8 | 3.3 |
| 50 | 15 | 6.6 | 3.6 |
| 55 | 15.8 | 7.2 | 4 |
| 60 | 16.8 | 8 | 4.7 |
| | Cake 1 mm | Cake 1 mm | Cake 1 mm |

TABLE VII

Filter Cake Removal Test
70-270 Sand/40-60 Proppant (sand); Test Temp. = 75° F.

| Fluid Pad | FPA | FPB | FPC |
|---|---|---|---|
| Particulate Type | $CaCO_3$ | $CaCO_3$ | Salt |
| Core Diameter, cm | 3.74 | 3.74 | 3.74 |
| Core Area, cm$^2$ | 10.98 | 10.98 | 10.98 |
| Core Length, cm | 31.75 | 31.75 | 31.75 |
| Water viscosity, cps | 1 | 1 | 1 |
| Water density, lb/gal | 8.345 | 8.345 | 8.345 |
| Initial Permeability | | | |
| Q, cc/min | 60 | 62 | 60 |
| DP, psi | 5.95 | 5 | 5.4 |
| $K_i$, md | 7144.47 | 8785.32 | 7872.15 |
| Filter Cake Formed @ 80 psi for 60 minutes: | | | |
| Spurt Loss, cc | 5 | 5 | 5 |
| Total Fluid Loss Volume, cc | 9 | 10 | 9 |

Displace drilling fluid with 1000 ml water @ 62 cc/min & 50 psi:
Fluid loss through core, cc  7  20  NM
Place 40/60 sand on top of sand column (the remaining filter cake will be sandwiched between the sand pack and the sand).
Flow D.I. water from the 70-270 sand side through 40-60 sand side to determine the removal of the remaining filter cake through the 40/60 sand:

| Return Permeability | | | |
|---|---|---|---|
| Volume pumped, ml | 100 | 100 | 100 |
| Q, cc/min | 62 | 23 | 60 |
| DP, psi | 8.7 | 140 | 7.5 |
| $K_f$, md | 5049,03 | 116.40 | 5667.95 |
| $K_f/K_i$ | 0.71 | 0.01 | 0.72 |
| Volume pumped, ml | 2000 | Plugged | 2000 |
| Q, cc/min | 62 | | 60 |
| DP, psi | 9.9 | | 6.24 |
| $K_f$, md | 4437.03 | | 6812.44 |
| $K_f/K_i$ | 0.62 | | 0.87 |
| Volume pumped, ml | 12000 | | 3000 |
| Q, cc/min | 62 | | 60 |
| DP, psi | 6.62 | | 6.15 |
| $K_f$, md | 6635.44 | | 6912.13 |

TABLE VII-continued

Filter Cake Removal Test
70-270 Sand/40-60 Proppant (sand); Test Temp. = 75° F.

| $K_f/K_i$ | 0.93 | 0.88 |
|---|---|---|

Particle Flow Tests

Additional testing was performed to see if it was possible for the filter cake particles to flow back through a pack of 40-60 U.S. mesh sand such as might be used as a proppant packed in a fracture. It was possible to place the filter cakes (from FPA, FPB and FPC) on a bed of 70-270 U.S. mesh sand (to simulate reservoir sand). The test procedure was as follows:

1. A bed of 40-60 U.S. mesh sand was placed on top of the 70-270 sand pack and was contained between the sand pack and a screen at the top of the cell.
2. Water was injected through the 70-270 U.S. mesh sand pack and 40-60 U.S. mesh sand pack to determine the effective initial permeability of both sand beds.
3. The 40-60 U.S. mesh sand pack was removed and a filter cake was produced on the 70-270 U.S. mesh sand pack by injecting the specific fluid pad across the face of the sand bed while holding a pressure of 80 psig (560 kPa) on this flow. This allowed the fluid pad to leak off through the sand pack and deposit its filter cake. The spurt (initial) and filtrate losses were measured and recorded.
4. The excess fluid pad was then displaced with filtered tap (or saturated NaCl brine) water and an induced pressure of 50 psig (350 kPa) was applied so that the filter cake would not be disturbed. The fluid loss through the sand pack was recorded.
5. The 40-60 U.S. mesh sand was then repacked on the 70-270 U.S. mesh pack.
6. Water was then injected from the 70-270 U.S. mesh sand pack side, through the 40-60 U.S. mesh sand pack. The flow rate and pressure drop across the two sand packs were recorded as a function of total volume of fluid displaced. The return permeability of the two sand packs could then be used to indicate the degree of filter cake particle displacement. Table VII reflects the results of the particle displacement tests.

The test using FPA showed an initial 71% return permeability, then dropped to 62% (due to particle invasion into the 40-60 U.S. mesh sand pack), and finally increased to 93% after a total of 12 liters of water was injected. This indicated that most of the filter cake particles were capable of flowing through a 40-60 U.S. mesh sand. However, this "particle flow" requires time and does not occur quickly. Nevertheless, it is demonstrated that the filter cake may be brought back through packed proppant in accordance with the method of the invention.

The "particle flow" tests using a filter cake deposited by the FPB fluid showed a very low return permeability. This low return permeability can be attributed to a retention of particles between the 70-270 U.S. mesh sand pack and 40-60 U.S. mesh sand. It is apparent that hydrochloric acid is required to remove filter cake particles when this fluid pad is used. As noted, this is an acceptable alternate approach to removing the filter cake after placement of the proppant. It is apparent that the cake from the combination of a wide distribution of graded $CaCO_3$ particles with a polymerized lignosulfonate of FPA is more easily removed than that of FPB.

The "particle flow" tests performed with a filter cake from the graded salt system, FPC, indicate a return permeability of 72% after displacement of 3 liters of tap water, at which time the injection pressure stabilized. The tap water is capable of dissolving approximately 3.1 lbm (1400 g) per U.S. gallon (3.785 ml) of tap water. Therefore, the graded salt (NaCl) particles are more readily removed in this test procedure.

Conclusions for Example 3

1. The erosion of filter cake particles by circulation of completion fluids (without solids) was not noted on any of the three filter cake systems tested. The viscosities and velocities of the "typical completion fluids" ranged from 1 cp ($10^3$ Pa.sec) to 113 (113,00 Pa.sec) and 1.9 ft/sec (60 cm/sec) to 5.7 ft/sec (175 cm/sec), respectively.
2. Most of the filter cake particles were readily displaced from the porous tube's surface with backflow and no gravel pack present.
3. When filter particles were "sandwiched" between formation sand and proppant, only partial removal by backflow was attained. Therefore, acidizing is required to speed up the clean up process and restore permeability on a comparative fluid such as FPB. However, FPA probably would not require these steps; this is further evidence that the filter cake particles come off the well bore surface as particles rather than in masses or clumps.
4. High leak-off rates were attained with the HEC viscosified fluid and this phenomenon was not seen on the dynamic filtration/filter cake stability test performed with the FPA fluid, again demonstrating the superiority of the subject inventive two-part system for improved fracturing.

EXAMPLE 4

Several fluid pads were prepared, modified and tested using a dynamic filtration unit and a return permeameter. Of the fluids tested, the following inventive fluid showed the most promise of being a fluid that can be used in several different situations to protect the production zone. The fluid described in Table VIII consists of water and four other products: Biozan as a thixotropic polymer, Filtrex as a modified complex lignosulfonate also used for filtration control, KCl for the inhibition of the clays in the formation and "SRP-0197" graded calcium carbonate. Although the system is quite simple, tests have demonstrated that the fluid can be used to fracture a wide range of permeable zones while minimizing formation damage. Later it will be demonstrated that the KCl may be eliminated.

TABLE VIII

Example 4 Formulation
Aged Temperature: 150° F. for 2 hours
Rheology @: 120° F.

| Pilot Test Additives | Example 4 |
|---|---|
| Tap Water | 317 |
| "BIOZAN" water soluble polymer | 1.5 |
| "FILTREX" modified lignosulfonate | 15 |
| KCl | 12.9 |
| "SRP-0197 graded $CaCO_3$" | 50 |
| Properties | |
| Density, lbm/gal | 9 |
| 600 rpm reading | 56 |
| 300 rpm reading | 44 |
| Plastic Viscosity, cP | 12 |
| Yield Point, lbf/100 ft$^2$ | 32 |
| Initial Gel, lbf/100 ft$^2$ | 15 |
| Ten Minute Gel, lbf/100 ft$^2$ | 20 |
| API Filtrate, cc/30 min. | 4.4 |

Testing

As mentioned, in order for a solid-ladened fluid to mechanically seal pore openings it first must be comprised of the proper size particles. The particle size analysis of "SRP-0197 graded CaCO$_3$" calcium carbonate of Milpark Drilling Fluids used in this fluid pad indicates a wide distribution of particles of very different sizes as shown in Table IX. As shown from Table IX, the particle size is evenly distributed from colloidal to 60 microns. Table X illustrates the particle size analysis of the fluid pad as tested, after complete formulation.

TABLE IX

Particle Size Analysis - "SRP 0197 Graded CaCO$_3$"
Cilas 715 Granulometer Particle Size Analyzer

| Particle Size (microns) | Percent Smaller Than Given Size | Percent Smaller Than Given Size, But Larger than Next Size |
|---|---|---|
| 128 | 100 | 0 |
| 96 | 100 | 6.8 |
| 64 | 100 | 6.8 |
| 48 | 86.4 | 20.3 |
| 32 | 66.1 | 12.4 |
| 24 | 53.7 | 10.4 |
| 16 | 43.3 | 7.3 |
| 12 | 36 | 7.2 |
| 8 | 28.8 | 6.2 |
| 6 | 22.6 | 5.8 |
| 4 | 16.8 | 3.9 |
| 3 | 12.9 | 2.9 |
| 2 | 10 | 2.8 |
| 1.5 | 7.2 | 1.2 |
| 1 | 6 | 6 |

| | |
|---|---|
| Calculated Surface Are (m$^2$/cm$^3$) | 1.48 |
| 90% Smaller than (microns) | 54.8 |
| 50% Smaller than (microns) | 21.2 |
| 10% Smaller than (microns) | 2 |

TABLE X

Particle Size Analysis - Formulated Fluid Pad
Cilas 715 Granulometer Particle Size Analyzer

| Particle Size (microns) | Percent Smaller Than Given Size | Percent Smaller Than Given Size, But Larger than Next Size |
|---|---|---|
| 192 | 100 | 0 |
| 128 | 94.2 | 17.2 |
| 96 | 77 | 19.3 |
| 64 | 57.7 | 11.9 |
| 48 | 45.8 | 16.9 |
| 32 | 28.9 | 8.8 |
| 24 | 20.1 | 5.8 |
| 16 | 14.3 | 4 |
| 12 | 10.3 | 3.9 |
| 8 | 6.4 | 2 |
| 6 | 4.4 | 1 |
| 4 | 3.4 | 0.6 |
| 3 | 2.8 | 0.5 |
| 2 | 2.3 | 0.8 |
| 1.5 | 1.5 | 0.3 |
| 1 | 1.2 | 1.2 |

| | |
|---|---|
| Calculated Surface Area (m$^2$/cm$^3$) | 0.41 |
| 90% Smaller than (microns) | 117.6 |
| 50% Smaller than (microns) | 53.2 |
| 10% Smaller than (microns) | 11.7 |

To demonstrate the ability of the fluid to mechanically seal the pore openings, dynamic filtration and return permeability tests were conducted using sands with low and high permeability. See Table XI below.

TABLE XI

| | Dynamic Filtration | Return Permeability |
|---|---|---|
| Low K | Berea Sandstone | South American Sandstone |

TABLE XI-continued

| | Dynamic Filtration | Return Permeability |
|---|---|---|
| High K | (±175 md) Aloxite (2-4 darcy) | (61 md) Berea Sandstone (1.5 darcy) |

Dynamic Filtration Test

The dynamic filtration tests were conducted at 250° F. with 500 psi differential pressure and stirring the fluid at 300 rpm for 30 minutes. The filter cakes formed from the dynamic filtration (see Table XII) were measured and found to be very thin (1-1.5 mm) and extremely durable. As one would expect, the cumulative filtration using the low permeability Berea was less than the filtration using the aloxite disk, but the equilibrium filtration rates after the filter cakes were formed were virtually identical. This illustrates that the resulting filter cakes have very low permeability and quickly control the filtration of the fluid.

TABLE XII

Dynamic Filtration Test
Temperature = 250° F.
Diff. Pressure = 500 psi
RPM = 300

| | Test 1 | Test 2 |
|---|---|---|
| Filter Medium | Aloxite (2-4 Darcy) | Berea (150 md) |
| Cake Thickness, mm | 1 | 1.5 |
| Time (minutes) | Cumulative Filtration (ml) | |
| 0 | 0 | 0 |
| 1 | 4.5 | 1.5 |
| 2 | 5.5 | 2 |
| 3 | 6 | 2.2 |
| 4 | 6.5 | 2.5 |
| 5 | 7 | 2.8 |
| 6 | 7.5 | 3.2 |
| 7 | 8 | 3.5 |
| 8 | 8.2 | 3.7 |
| 9 | 8.5 | 4 |
| 10 | 8.7 | 4.2 |
| 15 | 9.5 | 5 |
| 20 | 10.5 | 5.8 |
| 25 | 11.5 | 6.5 |
| 30 | 12 | 7.2 |

Return Permeability Test

The return permeability tests also indicate the fluid will minimize formation damage over a wide range of permeability. This test also indicates that the fluid pad will form a filter cake which will homogenize the permeability of the formation in the fracture area during the fracturing and thus provided more control and predictability during the process. Table XIII shows the return permeability test for a core of low and high permeability again demonstrating the fluid's ability to minimize formation damage.

TABLE XIII

Return Permeability Test

| | High Permeability Berea | | South American Sandstone | |
|---|---|---|---|---|
| | Before | After | Before | After |
| Time, sec. | 116 | 135 | 163 | 160 |
| Length, cm | 4.34 | 4.34 | 2.82 | 2.82 |
| Volume, cc | 20 | 20 | 15 | 15 |
| Pressure, psi | 4.2 | 4.2 | 37 | 40 |
| Viscosity, cP | 2.9 | 2.9 | 2.9 | 2.9 |
| Diameter, cm | 2.5 | 2.5 | 2.5 | 2.5 |
| Permeability, md | 1547 | 1329 | 61 | 57 |
| Return Permeability | 86% | | 94% | |

Cake Durability Test

A fluid pad should not only produce a thin filter cake with low fluid loss to the production zone, but it should also be durable. A durable filter cake is needed so that it can withstand fracturing and proppant placement. The proppant can then be placed without destroying the filter cake resulting in loss of fluid to the formation. To examine this process, the dynamic filtration unit was used with the drill-in fluid and water.

(1) First, a dynamic filter cake was built at 300 rpm for thirty (30) minutes.

(2) Second, static filtration was measured for thirty (30) minutes.

(3) Third, dynamic filtration at 600 rpm was measured for thirty (30) minutes to simulate circulating with a tool.

(4) Fourth, dynamic filtration at 600 rpm with water was measured for thirty (30) minutes to simulate the displacement of the drill-in fluid with water.

Table XIV shows the filtrate and the resulting cake thickness for the four aforementioned steps. It is noted that the filter cake thickness increased during the static mode, but was easily removed by the higher shear during the second dynamic filtration period. The filter cake proved to be very durable during the third dynamic filtration period when water was used at the high shear rate and no decrease in cake thickness was recorded with slight increase in filtrate rate during the final ten minutes.

TABLE XIV

Dynamic Filtration Results
Temperature = 250° F.
Diff. Pressure = 500 psi

| | Time (minutes) | Cumulative Filtration (ml) |
|---|---|---|
| Dynamic at 300 rpm | 0 | 0 |
| | 1 | 3.8 |
| | 2 | 4.2 |
| | 3 | 4.8 |
| | 4 | 5.4 |
| | 5 | 6 |
| | 6 | 6.4 |
| | 7 | 6.6 |
| | 8 | 7 |
| | 9 | 7.2 |
| | 10 | 7.4 |
| | 15 | 8.4 |
| | 20 | 9.4 |
| | 25 | 10.2 |
| Cake Thickness: 1 mm | 30 | 11 |
| Static | 40 | 12.4 |
| | 50 | 13.6 |
| Cake Thickness: 1.5 mm | 60 | 14.6 |
| Dynamic at 600 rpm | 70 | 15.6 |
| | 80 | 16.6 |
| Cake Thicksnss: 1 mm | 90 | 17.4 |
| Dynamic with water | 100 | 18.8 |
| at 600 rpm | 110 | 20.2 |
| Cake Thickness: 1 mm | 120 | 25 |

EXAMPLES 5, 6 and 7

Additional tests were conducted using the "Q-200" graded calcium carbonate from Huber to examine the effects of the liquid phase of the fluid. The tests indicated that reducing the KCl from four to two percent or switching to seawater had minor effects on filtration and cake quality. However the fluid prepared in freshwater had better rheological properties and filtration than when seawater was used. It may thus be understood that KCl may be eliminated from the formulation and seawater used. However, formation damage may result from fluid filtrate and as a result formation compatibility and sensitivity with the filtrate should be tested or studied. Table XV shows the formulations which were tested, 2% KCl seawater and freshwater. Table XVI provides the dynamic filtration results.

TABLE XV

Fluid Formulations of Examples 5-7
Aged Temperature: 150° F. for 2 hours
Rheology @: 120° F.

| | Ex. 5 | Ex. 6 | Ex. 7 |
|---|---|---|---|
| Pilot Test Additives | Pounds Per Barrel | | |
| Tap Water | 317 | — | 317 |
| Sea Water | — | 317 | — |
| "FILTREX" modified lignosulfonate | 15 | 15 | 15 |
| KCl | 6.4 | — | — |
| "BIOZAN" waters soluble polymer | 1.5 | 1.5 | 1.5 |
| "Q-200" calcium carbonate | 50 | 50 | 50 |
| Properties | | | |
| Plastic Viscosity, cP | 12 | 12 | 13 |
| Yield Point, lbf/100 ft$^2$ | 35 | 33 | 52 |
| Initial Gel, lbf/100 ft$^2$ | 18 | 15 | 23 |
| Ten Min. Gel, lbg/100 ft$^2$ | 25 | 19 | 28 |

TABLE XVI

Dynamic Filtration Results
Temperature = 250° F.
Diff. Pressure = 500 psi
RPM = 300
Cake Thickness = 1 mm

| | Example No: | | |
|---|---|---|---|
| | 5 | 6 | 7 |
| Time (minutes) | Cumulative Filtration (ml) | Cumulative Filtration (ml) | Cumulative Filtration (ml) |
| 0 | 0 | 0 | 0 |
| 1 | 4 | 3.8 | 6 |
| 2 | 5 | 4.6 | 6.6 |
| 3 | 5.6 | 5.2 | 7.2 |
| 4 | 6 | 5.8 | 7.8 |
| 5 | 6.4 | 6.2 | 8.2 |
| 6 | 7 | 6.8 | 8.8 |
| 7 | 7.2 | 7 | 9.2 |
| 8 | 7.5 | 7.2 | 9.4 |
| 9 | 7.8 | 7.4 | 9.8 |
| 10 | 8 | 7.8 | 10.2 |
| 15 | 9.2 | 8.6 | 11.8 |
| 20 | 10 | 9.2 | 13 |
| 25 | 10.8 | 10 | 14.2 |
| 30 | 11.4 | 10.8 | 15.6 |

EXAMPLE 8

The effects of drill solids contamination on a dilution fluid were also examined by employing one and two percent Rev Dust using a fluid of the following formation: tap water, 317; "BIOZAN" water soluble polymer, 1.5; "FILTREX" modified lignosulfonate, 15; "Q-200" calcium carbonate and KCl, 12.9; all units in pounds per barrel. One percent Rev Dust showed no detrimental effects compared to the base fluid, while two percent Rev Dust resulted in a slightly thicker filter cake on the dynamic filtration test.

EXAMPLE 9

The effects of adding 40/60 frac sand to the flush fluid for the inventive fluid pad were determined. The base fluid pad was prepared as in Example 5 and aged for 16 hours at 150° F., rotating. The flush fluid used in this test contained 1.5 ppb XCD polymer and 42.0 ppb 40/60 frac sand. The dynamic filtration test was conducted as follows:

1) 30 minutes at 300 rpm—(Dynamic filtration)
2) 30 minutes static filtration
3) 30 minutes at 600 rpm—(Dynamic filtration)

4) Cooled to room temperature, fluid removed, then filled with flush fluid 5) 60 minutes at 600 rpm—(Dynamic filtration)

The test indicated that the 40/60 frac sand had minimal effects on the filtration rate during the 60 minutes of exposure. The rate of filtration at the end of the first 10 minutes was 0.1 cc/min. and gradually increased to 0.14 cc/min. during the last 10 minutes of the test.

EXAMPLES 10–13

A series of four leakoff, regained and retained permeability tests have been conducted between two ⅜ in. Berea sandstone cores (10 in² each). The simulations included initial permeability evaluations of the Berea core, dynamic fluid loss of the fluid pad of Example 5 at 1000 psi ΔP, and placement of 2 lb/ft² and/or 4 lb/ft² of 20/40 or 16/30 Jordan sand with 2% KCl. Conductivity and permeability of the Jordan sand was evaluated for 50 hours and a regained permeability of the Berea core evaluated at the end of the 50 hour period. Cleanup was evaluated at 2000 psi closure and 150° F. with pH 7.02% KCl. The results are summarized in Table XVII.

Leakoff

The spurt of the fluid pad at 150° F. on 19 to 40 md Berea sandstone at 1000 psi ΔP was 0.020 to 0.026 gal/ft². Spurt ended within one minute or less. The leakoff coefficient at 1000 psi differential was measured between 0.0008 to 0.0009 in this series of four tests. The leakoff coefficient of the proppant transport fluid used in the method of this invention would have to be greater than this value.

Retained Permeability of Proppant

The retained permeability of 2 lb/ft² 20/40 or 16/30 Jordan placed between Berea sandstone were 63 and 67% based on permeabilities measured between Ohio sandstone (Table XVII). It is estimated that residual (Example 5—filter cake) damage created between 33 to 37% damage to the sand pack (proppant) permeability. High flow rates (250 ml/min) and pressure drops of 40 to 60 psi were initiated periodically after the first 20 hours of alternating core/pack flow. These high flow rates were necessary to obtain an additional 10% pack cleanup between 20 to 50 hours. Fines (white in color) were noted in the collected elution volumes.

The 4 lb/ft² 20/40 and 16/30 Jordan simulations cleaned up to 162 and 358 Darcies, providing 78 and 81% cleanup, respectively. The baseline permeability used for the determination of percent retained permeability was obtained from the "STIM-LAB PREDICT K" simulation program since data for 4 lb/ft² Jordan sand had not been directly evaluated.

Regained Permeability of Formation

The Berea sandstone used in the 2 lb/ft² simulations yielded an initial permeability of 19 to 26 md and had regained permeabilities after the 50 hour cleanup simulation of 6 to 14 md. Cleanup averaged 49% of four samples evaluated and 56% with 3 of 4 evaluations.

The second series of evaluations contained 4 lb/ft² Jordan sand and Berea sandstone with a permeability range of 30 to 40 md. The regained permeability ranged from 18 to 27 md giving a percent regained permeability average of the 4 test cores of 61.5%.

Figure 2:
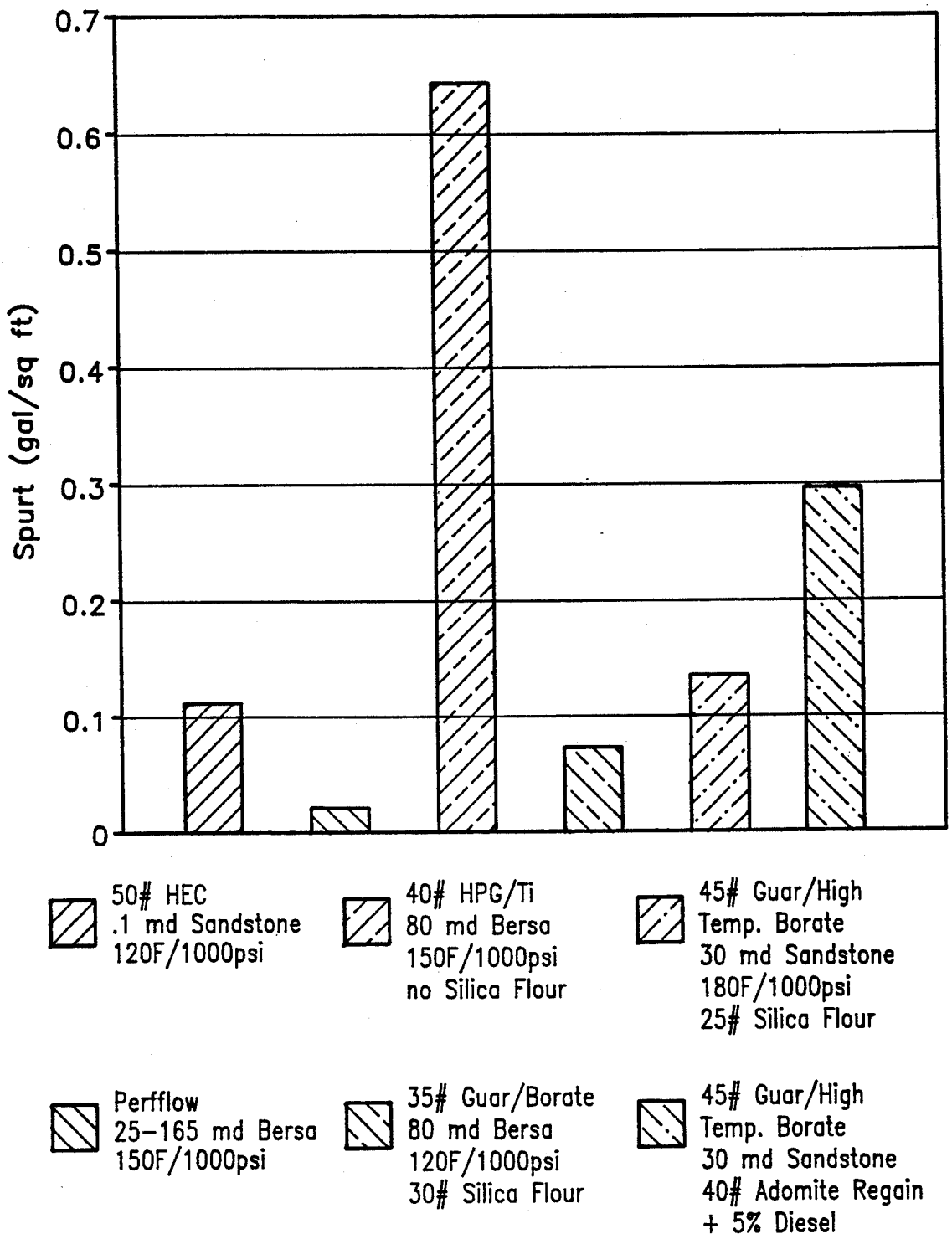
FIG. 2 is a summary of spurt loss measurements (gal/ft$^2$) in typical formation material exposed to the fluid pad of Example 5 as compared to various other systems.
Figure 3:
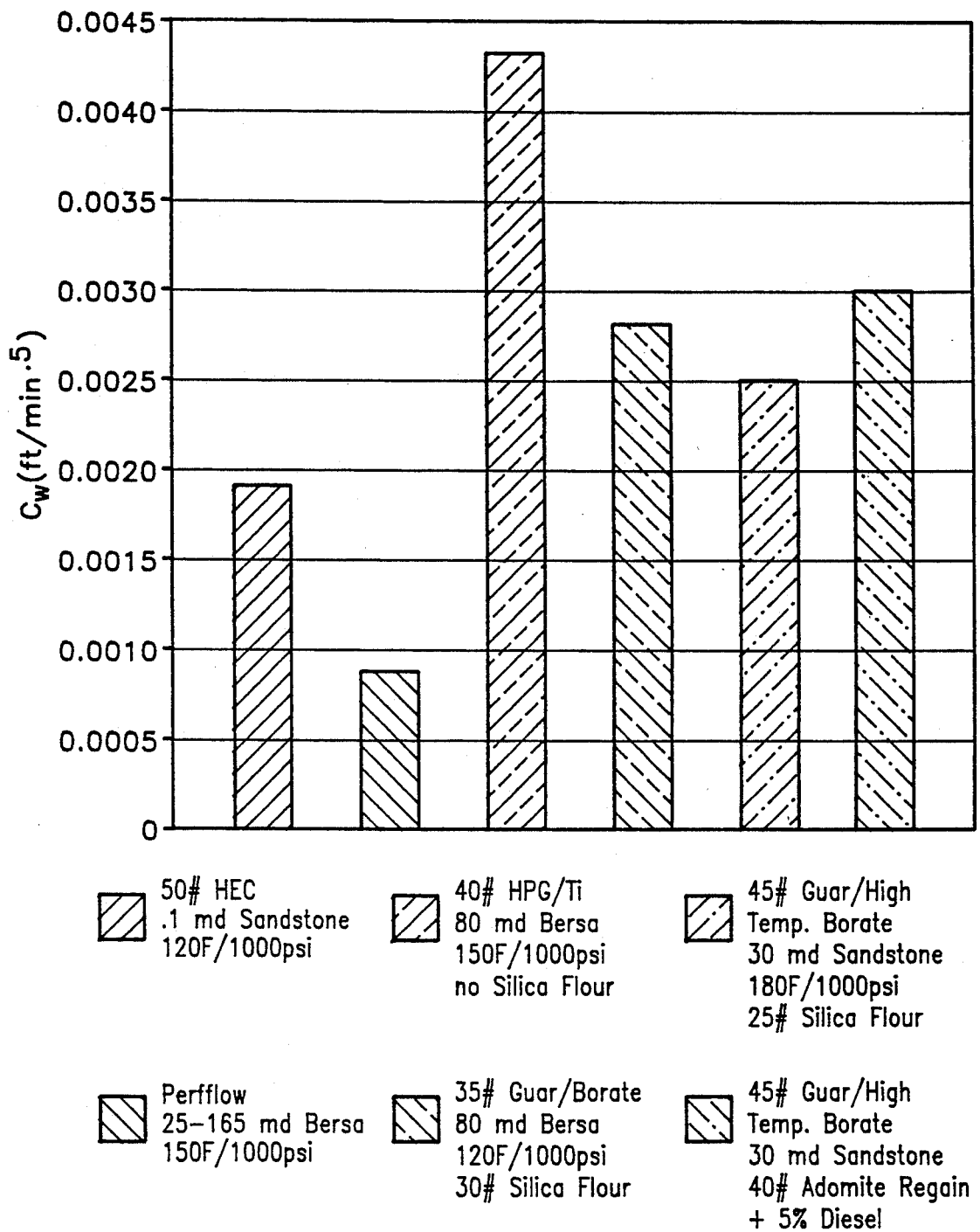
FIG. 3 is a summary of fluid loss coefficient, $C_w$ (ft/min$^{0.5}$) of the fluid pad of Example 5 as compared to various other systems in typical formation material, where $C_w$ is the fracturing fluid leakoff coefficient for wall-building effects for the various fluids and various formation sandstones.

Summary Charts—FIGS. 1–3

A series of three summary FIGS. are shown to compare the percent retained proppant permeability, $C_w$ and spurt of the fluid pad of Example 5 tested as suggested by this invention (referred to here as a gravel pack simulation to various systems used in fracturing under similar temperature conditions. FIG. 1 compares the percent retained permeability of 2 lb/ft² proppant loadings of various fracturing fluid systems and a 50 lb/1000 gal HEC gravel pack simulation to the percent retained permeability of the Example 5 fluid. The Example 5 fluid at 63 to 67% retained permeability at 150° F. is competitive with the "cleaner" frac fluid system of guar/borate at 68% retained permeability at 150° F. and a CMHEC/Al at 82% retained permeability at 175° F. These systems contain a breaker to aid in cleanup. The 50 lb/1000 gal HEC containing 0.5 lb/1000 gal AP in the slurry and at 175° F. yielded a 77% retained permeability in the gravel pack simulation and 41% in the fracturing simulation (closure from 0.33 in. to 0.25 in.). The increase in temperature aided in the increased percent retained permeability of the 50 lb/1000 HEC system. With post-simulation acid flush, the Example 5 fluid may yield both a better percent retained and percent regained permeability in the pack and core, though this has not been evaluated. Again, this would make the fluids of this invention excellent choices for use in the two-step fracturing process.

Summary FIGS. 2 and 3 show comparisons of spurt (gal/ft²) and $C_w$ (ft/min$^{0.5}$—the fracturing fluid leakoff

TABLE XVII

Dynamic Leakoff and Conductivity Summary of Inventive Fluid
Simulations Using Fluid Pad of Example 5 with 2.0 & 4.0 lb/ft³ 20/40 and 16/30 Jordan Sand Regain Fluid = 2% KCl  Leakoff Temp. = 150° F.
Core = Berea Sandstone  Final BHT = 150° F.
Leakoff DP = 1000 psi  Shear Rate = 40/sec

| Ex. | Spurt (gal/ft²) | $C_w$ (ft/min$^{0.5}$) | ELO (ml/min/cm²) | Conduct. (md-ft) | Perm. (Darcies) | % Retained Perm. Sand | Initial Perm. (md) | Final Perm. (md) | % Regained Perm. Berea |
|---|---|---|---|---|---|---|---|---|---|
| 10 | 2 lb/ft² 0.022 | 20/40 Jordan Sand 0.0009 | Cell 1 0.0075 | 2810 | 157 | 63 | Top Core 20 | 12 | 60 |
|  |  |  |  |  |  |  | Bottom Core 26 | 14 | 54 |
| 11 | 2 lb/ft² 0.025 | 16/30 Jordan Sand 0.0008 | Cell 2 0.0065 | 6409 | 339 | 67 | Top Core 19 | 10 | 53 |
|  |  |  |  |  |  |  | Bottom Core 20 | 6 | 30 |
| 12 | 4 lb/ft² 0.020 | 20/40 Jordan Sand 0.0008 | Cell 2 0.0062 | 5890 | 162 | 78 | Top Core 30 | 18 | 60 |
|  |  |  |  |  |  |  | Bottom Core 38 | 23 | 61 |
| 13 | 4 lb/ft² 0.026 | 16/30 Jordan Sand 0.0008 | Cell 1 0.0062 | 13291 | 358 | 81 | Top Core 40 | 27 | 68 |
|  |  |  |  |  |  |  | Bottom Core 35 | 20 | 57 | coefficient for wall-building effects) respectively, for the Example 5 fluid v. other fluid systems used in the simulations. Both the spurt and the $C_w$ created by the Example 5 fluid was lower than those generated by other fluid systems, again indicating excellent characteristics for use in the method of this invention.

The two-fluid system of this invention should ensure a tip screenout despite reservoir heterogeneities. As explained earlier, by placing a filter cake over a substantial portion or all of the fracture face, a screenout is intentionally formed near the tip of the fracture. The filter cake reduces leakoff over most or all of the fracture face thereby maximizing the fracturing pressure and reducing overall horsepower requirements for the same effective fracture result. It must be kept in mind that the filter cake formation and the fracturing occur essentially simultaneously. This procedure will maintain high fracture conductivity and maximize formation productivity. The improved fracturing system of this invention will have the characteristics set out in Table XVIII. Table XIX presents typical formation values for which the inventive fracturing technique would be applicable.

TABLE XVIII

| Inventive Tip Screen Out Fracturing System[1] | |
|---|---|
| Low leak-off | <0.005 with a nominal value of <0.0009 ft/min$^{0.5}$ |
| Spurt | <4 gals/100 ft$^2$ |
| Retained Fracture Conductivity (at 4 lbs/ft$^2$ proppant conc.) | >75% |
| Retained Formation Permeability | >60% |
| Hydraulic Horsepower (HHP) Requirements | <350 |
| Pump Rates | 3-4 bpm |

[1]Assumed parameters: 19-20 md Berea sandstone; 150° F.; 1000 psi leak-off pressure; 20-40 US Mesh gravel; 2000 psi closure for 50 hours. HHP and pump rate for 100' zone length at 6000'depth.

TABLE XIX

| Inventive Tip Screen Out Fracturing - Typical Formation Values | | |
|---|---|---|
| Property | Value Ranges | Nominal Value |
| Modulus | 0.1-1.0 MMpsi | 0.2 MMpsi |
| Fracture Toughness | 500-5000 psi | 3000 psi |
| Pad Volume | 500-1000 gals | 1000 gals |
| Pump Rates | 3-4 bpm | 3 bpm |
| Sand Transport[2] | HEC Xanvis Shellflo S Brine | HEC |
| Proppant Concentration | 4-14 lbs/ft$^2$ | 9 lbs/ft$^2$ |

[2]These are commercially available proppant transport fluids which may be used in accordance with the present invention.

Finally, Table XX provides an expected comparison between the inventive system (TSO-"FRACFLOW" fracturing system) and a conventional HEC system ("FRACPACK" fracturing system). It will be appreciated that to achieve the same results, the pump rate and proppant concentration will be reduced for the inventive system. More important is the fact that the expected hydraulic horsepower (HHP) requirements are reduced by about 80%. Even in hard rock formations, the method of this invention would be expected to achieve approximately 30% reduction in HHP requirements. This reduction in power requirements results in considerable cost savings for the inventive system.

TABLE XX

| Tip Screen Out Fracturing Job Comparison: HEC v. Inventive TSO-"FRACFLOW" fracturing system | | |
|---|---|---|
| Property | Conventional HEC | Inventive TSO-"FRACKFLOW" fracturing system |
| Modulus | 0.2 MMpsi | 0.2 MMpsi |
| Interval Length | 118 ft | 118 ft |
| TVD | 5800 ft | 5800 ft |
| BHP | 2900 psi | 2900 psi |
| Pump Rates | 10 bpm | 3 bpm |
| Sand Transport | HEC | HEC |
| Average Proppant Concentration | 14 lbs/ft$^2$ | 10.5 lbs/ft$^2$ |
| HHP | 1065 | 215 |
| Effective Propped Length | 37 ft | 37 ft |
| Total Proppant | 88.1 Klbs | 80.7 Klbs |
| Total Fluid | 19.4 Kgals | 17.2 Kgals |

EXAMPLES 14 and 15

Computer Simulator Comparison of the Inventive Method

Compared to Current Field Practices as Described in SPE 24844

F. L. Monus, et al., "Fracturing Unconsolidated Sand Formations Off-shore Gulf of Mexico," paper SPE 24844, *Annual Technical Conference and Exhibition*, Oct. 6-7, 1992 (SPE 24844) is a recently published technical paper describing the field application of TSO (tip screenout fracturing). The application of TSO presented is for two wells located in the Gulf of Mexico at Eugene Island Block 316. The wells, A-10 and A-8, are examples of the need and benefits of TSO. The paper gives comparative results between TSO and other completion options. Also presented are the problems and difficulties associated with TSO. The horsepower requirements and equipment necessary to perform current TSO techniques makes the use of a boat or other offshore vessel, separate from the production platform, a necessity in many applications. Space is not only a concern on offshore or inland water platforms, it is also a concern on some land well locations. The paper also points out the problems and time requirements for obtaining information from relatively small injection treatments or mini-fracs. The mini-frac data obtained from well A-10 was distorted by the use of loss circulation material prior to the injection test. The original laboratory data for the fluid loss coefficient was revised to account for formation heterogeneities.

The inventive method was compared to the TSO procedure presented in SPE 24844 by use of the "STIMPLAN" three-dimensional fracturing simulator developed by NSI in Tulsa, Okla. and licensed by Baker Sand Control. The data used for the computer simulations was taken from SPE 24844. Where information was not available from the published work, such as information regarding modulus and stresses, approximations were used. The approximations are based on technical data from other sources and acknowledged TSO fracturing experts. While it is understood that these assumptions may yield somewhat different results than the actual TSO results described in SPE 24844, all the data used in the computer simulation were held constant except for the application of the described inventive method. The fluid loss coefficient for HEC, the fluid pad and gravel transport fluid used for the TSO treatment in SPE 24844, was stated to be 0.007 ft/min$^{0.5}$. The comparison between the applied TSO technique in SPE 24844 and the inventive method was made by changing the fluid pad to the Example 5 fluid previously described. The fluid loss coefficient for the Example 5 fluid was 0.0009 ft/min$^{0.5}$. Also a conservative spurt loss value of 4 gals/100 ft$^2$ was used in the computer model. The use of the inventive method allowed the pump rates to be reduced from 10 bbls/min to 3 bbls/min and the initial pad volumes reduced from 18,000 gals to 2,600 gals. Copies of the model runs are reproduced as Table XXI for the Example 14 TSO current practice as substantially set forth in SPE 24844 and as Table XXII for the Example 15 inventive two-fluid system.

TABLE XXI

TSO Current Practice

Frac Summary * EUGENE ISLAND BLK 316, WELL A-8, PER SPE 24844
Filename: EUGA8H.FRK; Oct 19, 92

Design Data

| | | |
|---|---|---|
| FLUID LOSS: | Coefficient (ft/sqrt(min)) | 0.00700/0.00700 |
| | Spurt Loss (gal/100 sq ft) | 0.00/0.00 |
| FORMATION: | Modulus (MM psi) | 0.20 |
| | Fracture Height (ft) | 110.0 |
| | Fluid Loss Height (ft) | 110.0 |
| | Perforated Height (ft) | 110.0 |
| | Permeability (md) | 4.000 |
| | Overlying Stress Difference (psi) | 1 |
| | Overlying Modulus (MM psi) | 0.20 |
| | Underlying Stress Difference (psi) | 1 |
| | Underlying Modulus (MM psi) | 0.20 |
| TEMPERATURE: | Bottom Hole (deg F.) | 125 |
| PRESSURE: | Reservoir Pressure (psi) | 5550.0 |
| | Closure Pressure (psi) | 5900.0 |
| DEPTH: | Well Depth (ft) | 6668 |
| 3-D SIMULATOR | Step Size (ft) | 2.0 |
| PROGRAM CONTROL | Time Step (min) | Automatic |

Calculated Results
from 3-D Simulator
STIMPLAN (TM), NSI, Tulsa, OK
Licensed To: Baker Sand Control

| | | |
|---|---|---|
| ¼ LENGTH: | 'Hydraulic' length (ft) | 80 |
| | Propped length (ft) | 78 |
| PRESSURE: | Max Net Pressure (psi) | 139 |
| | Surface Pres @ End of Pad (psi) | 4664 |
| | Surface Pres @ End of Job (psi) | 6338 |
| | Maximum Hydraulic Horsepower | 1584 |
| TIME: | Max Exposure to Form. Temp. (min) | 38.2 |
| | Time to Close (min) | 33.5 |
| RATE: | Fluid Loss Rate during pad (bpm) | 7.0 |
| EFFICIENCY: | at end of pumping schedule | 0.34 |
| PROPPANT: | Average In Situ Conc. (#/sq ft) | 5.8 |
| | Average Conductivity (md-ft) | 2888 |
| HEIGHT: | Max Fracture Height (ft) | 172 |
| WIDTH: | Avg width at end of pumping (in) | 1.00 |

STIMPLAN (TM). NSI Technologies, Tulsa, OK
Licensed To: Baker Sand Control
WELL ID:
EUGENE ISLAND BLK 316, WELL A-8, PER SPE 24844

| | | |
|---|---|---|
| DEPTH: | Well Depth (ft) | 6668 |
| PRESSURE: | Reservoir Pressure (psi) | 5550 |
| | Closure Pressure (psi) | 5900 |
| TEMPERATURE: | Bottom Hole Temperature (deg F.) | 125 |

Pumping Schedule

| S1 Vol (Mgal) | F1 Vol (Mgal) | Conc (ppg) | Rate (bpm) | Fluid Type | Prop Type | Cum Prop (M-lb) | Pump Time (min) |
|---|---|---|---|---|---|---|---|
| 18.0 | 18.0 | 0.0 | 10.0 | 1 | 1 | 0.0 | 42.9 |
| 3.7 | 3.4 | 2.0 | 10.0 | 1 | 1 | 6.8 | 8.8 |
| 3.0 | 2.6 | 3.0 | 10.0 | 1 | 1 | 14.7 | 7.1 |
| 3.0 | 2.5 | 4.0 | 10.0 | 1 | 1 | 24.8 | 7.1 |
| 3.0 | 2.4 | 6.0 | 10.0 | 1 | 1 | 39.0 | 7.1 |
| 3.0 | 2.2 | 8.0 | 10.0 | 1 | 1 | 56.6 | 7.1 |
| 3.0 | 2.1 | 10.0 | 10.0 | 1 | 1 | 77.2 | 7.1 |
| 3.0 | 1.9 | 12.0 | 10.0 | 1 | 1 | 100.5 | 7.1 |
| 3.0 | 1.8 | 14.0 | 10.0 | 1 | 1 | 126.2 | 7.2 |
| Total Slurry | | | 42.7 | | Total Fluid | 37.0 | |
| Total Proppant | | | 126.2 | | Avg. Conc. | 3.4 | |
| Total Pump Time | | | 101.6 min | | | | |

| Proppant ID No. 1 | | | | 20–40 Ottawa—Snd | | | |
|---|---|---|---|---|---|---|---|
| Specific Gravity | | | | | | | 2.65 |
| 'Damage Factor' | | | | | | | 0.70 |
| Proppant Stress (Mpsi) | | | 0 | 2 | 4 | 8 | 16 |
| KfW @ 2 #/sq ft (md-ft) | | | 4800 | 3850 | 2750 | 990 | 50 |

TABLE XXI-continued
TSO Current Practice

Fluid ID No. 1      75_lb/1000_gal_HEC-10
Specific Gravity    1.04

|  | @Welbor | @FormTmp | @1 Hr | @2 Hr | @4 Hr | @8 Hr |
|---|---|---|---|---|---|---|
| vis (cp @ 170 1/sec.) | 267 | 185 | 185 | 185 | 107 | 66 |
| non-Newtonian n' | 0.33 | 0.45 | 0.45 | 0.45 | 0.60 | 0.65 |
| K(lbysec/ft 2) × 1000 | 170.80 | 63.90 | 63.90 | 63.90 | 17.11 | 8.16 |

| Q (bpm) | P/dL (psi/100 ft) |
|---|---|
| 1.0 | 12.1 |
| 2.0 | 15.0 |
| 3.0 | 17.0 |
| 4.0 | 18.5 |
| 5.0 | 19.8 |

Measured Depth (ft)    6668.0

Time History * NSI STIMPLAN 3-D Fracture Simulation
EUGENE ISLAND BLK 316, WELL A-8, PER SPE 24844

| Time (min) | Pen (ft) | Pres (psi) | Rate (bpm) | Prop (PPG) | Sl Vol (MGal) | Eff-ciency | Loss (bpm) | Hght (ft) | W-Avg (in) |
|---|---|---|---|---|---|---|---|---|---|
| 2.7 | 6 | 138 | 10.0 | 0.0 | 1.1 | 0.68 | 3.1 | 111 | 0.98 |
| 4.9 | 8 | 138 | 10.0 | 0.0 | 2.1 | 0.67 | 3.1 | 111 | 1.26 |
| 5.6 | 10 | 138 | 10.0 | 0.0 | 2.4 | 0.65 | 4.1 | 111 | 1.14 |
| 6.3 | 12 | 138 | 10.0 | 0.0 | 2.6 | 0.63 | 5.1 | 111 | 1.04 |
| 6.8 | 14 | 138 | 10.0 | 0.0 | 2.8 | 0.60 | 5.8 | 111 | 0.94 |
| 7.3 | 16 | 138 | 10.0 | 0.0 | 3.1 | 0.57 | 7.0 | 112 | 0.86 |
| 7.8 | 18 | 138 | 10.0 | 0.0 | 3.3 | 0.55 | 7.2 | 112 | 0.79 |
| 9.0 | 20 | 138 | 10.0 | 0.0 | 3.8 | 0.52 | 6.5 | 112 | 0.78 |
| 10.2 | 22 | 138 | 10.0 | 0.0 | 4.3 | 0.50 | 6.5 | 112 | 0.77 |
| 11.3 | 24 | 138 | 10.0 | 0.0 | 4.7 | 0.49 | 6.3 | 112 | 0.76 |
| 12.6 | 26 | 138 | 10.0 | 0.0 | 5.3 | 0.47 | 6.8 | 113 | 0.75 |
| 13.7 | 28 | 138 | 10.0 | 0.0 | 5.8 | 0.46 | 6.4 | 113 | 0.75 |
| 15.0 | 30 | 138 | 10.0 | 0.0 | 6.3 | 0.45 | 6.6 | 113 | 0.74 |
| 16.4 | 32 | 138 | 10.0 | 0.0 | 6.9 | 0.44 | 6.9 | 113 | 0.74 |
| 17.7 | 34 | 138 | 10.0 | 0.0 | 7.4 | 0.43 | 6.7 | 113 | 0.74 |
| 19.2 | 36 | 138 | 10.0 | 0.0 | 8.1 | 0.42 | 7.1 | 114 | 0.73 |
| 20.6 | 38 | 138 | 10.0 | 0.0 | 8.7 | 0.41 | 6.8 | 114 | 0.73 |
| 22.2 | 40 | 139 | 10.0 | 0.0 | 9.3 | 0.40 | 7.3 | 114 | 0.73 |
| 23.8 | 42 | 139 | 10.0 | 0.0 | 10.0 | 0.39 | 6.9 | 114 | 0.73 |
| 25.4 | 44 | 139 | 10.0 | 0.0 | 10.6 | 0.39 | 7.1 | 114 | 0.73 |
| 27.1 | 46 | 139 | 10.0 | 0.0 | 11.4 | 0.38 | 7.3 | 115 | 0.73 |
| 28.9 | 48 | 139 | 10.0 | 0.0 | 12.1 | 0.37 | 7.2 | 115 | 0.73 |
| 30.8 | 50 | 139 | 10.0 | 0.0 | 12.9 | 0.37 | 7.4 | 115 | 0.73 |
| 32.7 | 52 | 139 | 10.0 | 0.0 | 13.7 | 0.36 | 7.3 | 115 | 0.73 |
| 34.7 | 54 | 139 | 10.0 | 0.0 | 14.6 | 0.35 | 7.5 | 115 | 0.74 |
| 36.6 | 56 | 139 | 10.0 | 0.0 | 15.4 | 0.35 | 7.4 | 123 | 0.73 |
| 39.7 | 58 | 139 | 10.0 | 0.0 | 16.7 | 0.34 | 7.2 | 128 | 0.71 |
| 45.7 | 60 | 138 | 10.0 | 0.0 | 19.2 | 0.34 | 7.0 | 132 | 0.76 |
| 49.8 | 62 | 137 | 10.0 | 2.0 | 20.9 | 0.33 | 7.0 | 136 | 0.76 |
| 54.4 | 64 | 135 | 10.0 | 2.0 | 22.9 | 0.33 | 6.8 | 141 | 0.77 |
| 58.7 | 66 | 133 | 10.0 | 3.0 | 24.7 | 0.33 | 6.9 | 145 | 0.78 |
| 63.0 | 68 | 131 | 10.0 | 4.0 | 26.5 | 0.33 | 6.9 | 150 | 0.79 |
| 67.5 | 70 | 129 | 10.0 | 4.0 | 28.3 | 0.33 | 6.9 | 154 | 0.80 |
| 71.9 | 72 | 127 | 10.0 | 6.0 | 30.2 | 0.33 | 6.9 | 158 | 0.80 |
| 76.8 | 74 | 125 | 10.0 | 6.0 | 32.3 | 0.33 | 6.9 | 163 | 0.81 |
| 81.6 | 76 | 123 | 10.0 | 8.0 | 34.3 | 0.33 | 6.9 | 167 | 0.81 |
| 86.9 | 78 | 122 | 10.0 | 10.0 | 36.5 | 0.33 | 6.8 | 172 | 0.82 |
| 92.6 | 80 | 121 | 10.0 | 10.0 | 38.9 | 0.33 | 6.8 | 172 | 0.87 |
| ScreenOut in Stage 2 at Time = 92.6 min at 75 ft | | | | | | | | | |
| 96.6 | 80 | 128 | 10.0 | 12.0 | 40.6 | 0.33 | 5.7 | 172 | 0.93 |
| ScreenOut in Stage 2 at Time = 96.6 min at 71 ft | | | | | | | | | |
| 101.6 | 80 | 137 | 10.0 | 14.0 | 42.7 | 0.34 | 5.4 | 172 | 1.00 |
| ScreenOut in Stage 2 at Time = 101.6 min at 69 ft | | | | | | | | | |
| 108.3 | 80 | 124 | 0.0 | 0.0 | 42.7 | 0.31 | 5.0 | 172 | 0.90 |
| 115.1 | 80 | 110 | 0.0 | 0.0 | 42.7 | 0.27 | 4.8 | 172 | 0.82 |
| 122.3 | 80 | 96 | 0.0 | 0.0 | 42.7 | 0.24 | 4.5 | 172 | 0.73 |
| 129.4 | 80 | 82 | 0.0 | 0.0 | 42.7 | 0.21 | 4.3 | 172 | 0.66 |
| 135.1 | 80 | 69 | 0.0 | 0.0 | 42.7 | 0.19 | 4.2 | 172 | 0.61 |

GEOMETRY SUMMARY * At End of Pumping Schedule
EUGENE ISLAND BLK 316, WELL A-8, PER SPE 24844

| Dstnce (ft) | Press (psi) | W-Avg (in) | Q (bpm) | Sh-Rate (1/sec) | Hght (ft) Total | Up | Dn | Prop | Bank Fraction | Prop (PSF) |
|---|---|---|---|---|---|---|---|---|---|---|
| 2 | 137 | 1.20 | 5.0 | 1 | 172 | 31 | 31 | 172 | 0.00 | 6.74 |
| 5 | 137 | 1.20 | 4.7 | 1 | 172 | 31 | 31 | 172 | 0.00 | 6.73 |
| 7 | 137 | 1.20 | 4.6 | 1 | 172 | 31 | 31 | 172 | 0.00 | 6.78 |
| 9 | 137 | 1.20 | 4.4 | 1 | 172 | 31 | 31 | 172 | 0.00 | 7.04 |
| 11 | 137 | 1.20 | 4.3 | 1 | 172 | 31 | 31 | 172 | 0.00 | 6.71 |
| 13 | 137 | 1.20 | 4.2 | 1 | 172 | 31 | 31 | 172 | 0.00 | 6.44 |
| 15 | 137 | 1.19 | 4.0 | 1 | 172 | 31 | 31 | 172 | 0.00 | 6.79 |

TABLE XXI-continued

TSO Current Practice

| 17 | 137 | 1.19 | 3.9 | 1 | 172 | 31 | 31 | 172 | 0.00 | 6.78 |
|---|---|---|---|---|---|---|---|---|---|---|
| 19 | 137 | 1.19 | 3.7 | 1 | 171 | 31 | 31 | 171 | 0.00 | 6.75 |
| 21 | 137 | 1.18 | 3.6 | 1 | 170 | 30 | 30 | 170 | 0.00 | 6.45 |
| 23 | 137 | 1.17 | 3.5 | 1 | 169 | 29 | 29 | 169 | 0.00 | 6.29 |
| 25 | 137 | 1.16 | 3.3 | 1 | 167 | 29 | 29 | 167 | 0.00 | 6.27 |
| 27 | 136 | 1.16 | 3.2 | 1 | 166 | 28 | 28 | 166 | 0.00 | 6.24 |
| 29 | 136 | 1.15 | 3.0 | 1 | 164 | 27 | 27 | 164 | 0.00 | 6.40 |
| 31 | 136 | 1.14 | 2.9 | 0 | 162 | 26 | 26 | 162 | 0.00 | 6.13 |
| 33 | 136 | 1.13 | 2.8 | 0 | 160 | 25 | 25 | 160 | 0.00 | 5.63 |
| 35 | 136 | 1.12 | 2.6 | 0 | 158 | 24 | 24 | 158 | 0.00 | 5.65 |
| 37 | 136 | 1.11 | 2.5 | 0 | 156 | 23 | 23 | 156 | 0.00 | 5.98 |
| 39 | 136 | 1.10 | 2.3 | 0 | 153 | 22 | 22 | 153 | 0.00 | 5.93 |
| 41 | 136 | 1.09 | 2.2 | 0 | 151 | 20 | 20 | 151 | 0.00 | 5.17 |
| 43 | 136 | 1.07 | 2.1 | 0 | 148 | 19 | 19 | 148 | 0.00 | 5.10 |
| 45 | 136 | 1.06 | 2.0 | 0 | 145 | 17 | 17 | 145 | 0.00 | 5.10 |
| 47 | 136 | 1.04 | 1.8 | 0 | 141 | 16 | 16 | 141 | 0.00 | 5.05 |
| 49 | 136 | 1.03 | 1.7 | 0 | 138 | 14 | 14 | 138 | 0.00 | 5.41 |
| 51 | 136 | 1.01 | 1.6 | 0 | 134 | 12 | 12 | 134 | 0.00 | 4.23 |
| 53 | 136 | 0.99 | 1.4 | 0 | 130 | 10 | 10 | 130 | 0.00 | 3.97 |
| 55 | 136 | 0.97 | 1.3 | 0 | 126 | 8 | 8 | 126 | 0.00 | 4.49 |
| 57 | 136 | 0.90 | 1.2 | 0 | 112 | 1 | 1 | 112 | 0.00 | 4.35 |
| 59 | 136 | 0.89 | 1.0 | 0 | 110 | 0 | 0 | 110 | 0.00 | 4.35 |
| 61 | 136 | 0.89 | 0.9 | 0 | 110 | 0 | 0 | 110 | 0.00 | 4.48 |
| 63 | 136 | 0.85 | 0.8 | 0 | 105 | 0 | 0 | 105 | 0.00 | 4.32 |
| 65 | 136 | 0.80 | 0.7 | 0 | 98 | 0 | 0 | 98 | 0.00 | 4.72 |
| 67 | 136 | 0.74 | 0.6 | 0 | 91 | 0 | 0 | 91 | 0.00 | 5.61 |
| 69 | 135 | 0.67 | 0.4 | 0 | 83 | 0 | 0 | 83 | 0.72 | 5.18 |
| 71 | 135 | 0.59 | 0.3 | 0 | 74 | 0 | 0 | 74 | 1.00 | 6.43 |
| 73 | 126 | 0.56 | 0.2 | 1 | 63 | 0 | 0 | 63 | 1.00 | 5.16 |
| 75 | 126 | 0.91 | 0.2 | 0 | 49 | 0 | 0 | 49 | 1.00 | 8.36 |
| 77 | 119 | 0.28 | 0.1 | 3 | 37 | 0 | 0 | 37 | 1.00 | 2.54 |
| 79 | 119 | 0.32 | 0.2 | 2 | 37 | 0 | 0 | 37 | 0.00 | 0.00 |

FLUID SUMMARY * At End of Pumping Schedule
EUGENE ISLAND BLK 316, WELL A-8, PER SPE 24844

| Stage No | Fluid Gone | Prop ID | Pos (ft) | Concentration | | | Fl Vol (MGal) | Ex Tim (min) | Temp (deg F.) | Visc (cp) | Fall Frac |
|---|---|---|---|---|---|---|---|---|---|---|---|
| | | ID | | In | Now | Desgn | | | | | |
| 1 | 1 | 1 | 1 | 80 | 0.0 | 0.0 | 0.0 | 1.1 | 15.1 | 125 | 990 | 0.00 |
| 1 | 1 | 1 | 1 | 80 | 0.0 | 0.0 | 0.0 | 2.1 | 13.4 | 125 | 945 | 0.00 |
| 1 | 1 | 1 | 1 | 80 | 0.0 | 0.0 | 0.0 | 2.4 | 14.4 | 125 | 885 | 0.00 |
| 1 | 1 | 1 | 1 | 80 | 0.0 | 0.0 | 0.0 | 2.6 | 15.4 | 125 | 885 | 0.00 |
| 1 | 1 | 1 | 1 | 80 | 0.0 | 0.0 | 0.0 | 2.8 | 14.6 | 125 | 875 | 0.00 |
| 1 | 1 | -1 | 1 | 80 | 0.0 | 0.0 | 0.0 | 3.1 | 15.0 | 125 | 871 | 0.00 |
| 1 | 1 | 1 | 1 | 80 | 0.0 | 0.0 | 0.0 | 3.3 | 16.7 | 125 | 871 | 0.00 |
| 1 | 1 | 1 | 1 | 80 | 0.0 | 0.0 | 0.0 | 3.8 | 17.3 | 125 | 885 | 0.00 |
| 1 | 1 | 1 | 1 | 80 | 0.0 | 0.0 | 0.0 | 4.3 | 17.9 | 125 | 887 | 0.00 |
| 1 | 1 | 1 | 1 | 80 | 0.0 | 0.0 | 0.0 | 4.7 | 17.4 | 125 | 896 | 0.00 |
| 1 | 1 | 1 | 1 | 80 | 0.0 | 0.0 | 0.0 | 5.3 | 18.0 | 125 | 899 | 0.00 |
| 1 | 1 | 1 | 1 | 80 | 0.0 | 0.0 | 0.0 | 5.8 | 18.6 | 125 | 1083 | 0.00 |
| 1 | 1 | 1 | 1 | 80 | 0.0 | 0.0 | 0.0 | 6.3 | 21.1 | 125 | 1287 | 0.00 |
| 1 | 1 | 1 | 1 | 80 | 0.0 | 0.0 | 0.0 | 6.9 | 22.8 | 125 | 1200 | 0.00 |
| 1 | 1 | 1 | 1 | 80 | 0.0 | 0.0 | 0.0 | 7.4 | 26.3 | 125 | 1200 | 0.00 |
| 1 | 1 | 1 | 1 | 80 | 0.0 | 0.0 | 0.0 | 8.1 | 24.7 | 125 | 1244 | 0.00 |
| 1 | 1 | 1 | 1 | 80 | 0.0 | 0.0 | 0.0 | 8.7 | 27.6 | 125 | 1192 | 0.00 |
| 1 | 1 | 1 | 1 | 80 | 0.0 | 0.0 | 0.0 | 9.3 | 30.4 | 125 | 1192 | 0.00 |
| 1 | 1 | 1 | 1 | 80 | 0.0 | 0.0 | 0.0 | 10.0 | 28.6 | 125 | 1176 | 0.00 |
| 1 | 1 | 1 | 1 | 80 | 0.0 | 0.0 | 0.0 | 10.6 | 31.1 | 125 | 1174 | 0.00 |
| 1 | 1 | 1 | 1 | 80 | 0.0 | 0.0 | 0.0 | 11.4 | 33.5 | 125 | 1158 | 0.00 |
| 1 | 1 | 1 | 1 | 80 | 0.0 | 0.0 | 0.0 | 12.1 | 36.0 | 125 | 1158 | 0.00 |
| 1 | 1 | 1 | 1 | 80 | 0.0 | 0.0 | 0.0 | 12.9 | 34.1 | 125 | 1185 | 0.00 |
| 1 | 1 | 1 | 1 | 80 | 0.0 | 0.0 | 0.0 | 13.7 | 36.2 | 125 | 1170 | 0.00 |
| 1 | 1 | 1 | 1 | 80 | 0.0 | 0.0 | 0.0 | 14.6 | 36.5 | 125 | 1170 | 0.00 |
| 1 | 1 | 1 | 1 | 80 | 0.0 | 0.0 | 0.0 | 15.4 | 36.5 | 125 | 1195 | 0.00 |
| 1 | 1 | 1 | 1 | 80 | 0.0 | 0.0 | 0.0 | 16.7 | 36.6 | 125 | 1211 | 0.00 |
| 1 | 1 | 1 | 1 | 80 | 0.0 | 0.0 | 0.0 | 18.0 | 37.7 | 125 | 1035 | 0.00 |
| 2 | 1 | 1 | 1 | 80 | 2.0 | 44.2 | 0.0 | 19.2 | 37.7 | 125 | 1138 | 0.00 |
| 2 | 1 | 1 | 1 | 74 | 2.0 | 44.2 | 0.0 | 20.9 | 38.0 | 125 | 1287 | 0.00 |
| 2 | 1 | 1 | 1 | 70 | 2.0 | 44.2 | 0.0 | 21.7 | 38.2 | 125 | 1287 | 0.00 |
| 3 | 0 | 1 | 1 | 67 | 3.0 | 28.1 | 2.0 | 22.8 | 33.9 | 125 | 1287 | 0.00 |
| 3 | 0 | 1 | 1 | 63 | 3.0 | 13.1 | 3.1 | 24.4 | 29.4 | 125 | 1287 | 0.01 |
| 4 | 0 | 1 | 1 | 57 | 4.0 | 11.9 | 4.5 | 25.9 | 24.8 | 125 | 1287 | 0.01 |
| 4 | 0 | 1 | 1 | 52 | 4.0 | 9.1 | 5.6 | 26.8 | 24.8 | 125 | 1287 | 0.01 |
| 5 | 0 | 1 | 1 | 49 | 6.0 | 14.1 | 6.0 | 27.3 | 19.9 | 125 | 1287 | 0.00 |
| 5 | 0 | 1 | 1 | 45 | 6.0 | 12.0 | 6.8 | 28.8 | 14.8 | 125 | 1287 | 0.00 |
| 5 | 0 | 1 | 1 | 41 | 6.0 | 10.5 | 7.7 | 29.1 | 14.8 | 125 | 1287 | 0.00 |
| 6 | 0 | 1 | 1 | 38 | 8.0 | 14.3 | 7.9 | 30.3 | 9.3 | 125 | 1287 | 0.00 |
| 6 | 0 | 1 | 1 | 33 | 8.0 | 12.5 | 8.8 | 31.3 | 9.3 | 125 | 1287 | 0.00 |
| 7 | 0 | 1 | 1 | 30 | 10.0 | 16.0 | 8.9 | 31.7 | 4.5 | 125 | 1287 | 0.00 |
| 7 | 0 | 1 | 1 | 25 | 10.0 | 14.2 | 9.9 | 33.3 | 0.0 | 125 | 1287 | 0.00 |
| 7 | 0 | 1 | 1 | 21 | 10.0 | 12.9 | 10.8 | 33.4 | 0.0 | 125 | 1287 | 0.00 |

TABLE XXI-continued

TSO Current Practice

| | | | | | | | | | | | | |
|---|---|---|---|---|---|---|---|---|---|---|---|---|
| 8 | 0 | 1 | 1 | 17 | 12.0 | 15.6 | 10.9 | 34.9 | 0.0 | 100 | 1837 | 0.00 |
| 8 | 0 | 1 | 1 | 12 | 12.0 | 14.0 | 12.0 | 35.3 | 0.0 | 79 | 2478 | 0.00 |
| 9 | 0 | 1 | 1 | 9 | 14.0 | 16.5 | 12.0 | 36.0 | 0.0 | 77 | 2556 | 0.00 |
| 9 | 0 | 1 | 1 | 4 | 14.0 | 15.3 | 12.9 | 37.3 | 0.0 | 73 | 2716 | 0.00 |

PROPPANT SUMMARY * At End of Pumping Schedule
EUGENE ISLAND BLK 316, WELL A-8, PER SPE 24844
Lb/Sq-Ft Lost to Embedment    2.000

| Distance (ft) | KfW (md-ft) | Proppant Concentration (lb/sq foot) Prop ID→ 1 |
|---|---|---|
| 2 | 3545 | 6.70 |
| 5 | 3540 | 6.70 |
| 7 | 3575 | 6.80 |
| 9 | 3771 | 7.00 |
| 11 | 3527 | 6.70 |
| 13 | 3324 | 6.40 |
| 15 | 3582 | 6.80 |
| 17 | 3576 | 6.80 |
| 19 | 3559 | 6.80 |
| 21 | 3331 | 6.40 |
| 23 | 3211 | 6.30 |
| 25 | 3193 | 6.30 |
| 27 | 3171 | 6.20 |
| 29 | 3294 | 6.40 |
| 31 | 3090 | 6.10 |
| 33 | 2717 | 5.60 |
| 35 | 2736 | 5.70 |
| 37 | 2979 | 6.00 |
| 39 | 2944 | 5.90 |
| 41 | 2376 | 5.20 |
| 43 | 2318 | 5.10 |
| 45 | 2322 | 5.10 |
| 47 | 2282 | 5.00 |
| 49 | 2556 | 5.40 |
| 51 | 1672 | 4.20 |
| 53 | 1471 | 4.00 |
| 55 | 1864 | 4.50 |
| 57 | 1757 | 4.30 |
| 59 | 1760 | 4.40 |
| 61 | 1858 | 4.50 |
| 63 | 1736 | 4.30 |
| 65 | 2036 | 4.70 |
| 67 | 2702 | 5.60 |
| 69 | 2384 | 5.20 |
| 71 | 3314 | 6.40 |
| 73 | 2365 | 5.20 |
| 75 | 4761 | 8.40 |
| 77 | 402 | 2.50 |
| 79 | 0 | 0.00 |
| Average Conductivity (md-ft) | 2773 | |

PROPPANT SUMMARY * At Fracture Closure
EUGENE ISLAND BLK 316, WELL A-8, PER SPE 24844
Lb/Sq-Ft Lost to Embedment    2.000

| Distance (ft) | KfW (md-ft) | Proppant Concentration (lb/sq foot) Prop ID→ 1 |
|---|---|---|
| 2 | 2907 | 5.90 |
| 5 | 2903 | 5.90 |
| 7 | 2915 | 5.90 |
| 9 | 3077 | 6.10 |
| 11 | 3199 | 6.30 |
| 13 | 2876 | 5.80 |
| 15 | 2817 | 5.80 |
| 17 | 3037 | 6.00 |
| 19 | 3023 | 6.00 |
| 21 | 2990 | 6.00 |
| 23 | 2972 | 6.00 |
| 25 | 2761 | 5.70 |
| 27 | 2839 | 5.80 |
| 29 | 2823 | 5.80 |
| 31 | 2799 | 5.70 |
| 33 | 3345 | 6.50 |
| 35 | 2766 | 5.70 |
| 37 | 2521 | 5.40 |
| 39 | 2532 | 5.40 |
| 41 | 2911 | 5.90 |
| 43 | 2882 | 5.80 |
| 45 | 2535 | 5.40 |
| 47 | 2409 | 5.20 |
| 49 | 2553 | 5.40 |

TABLE XXI-continued

TSO Current Practice

| | | |
|---|---|---|
| 51 | 2515 | 5.40 |
| 53 | 2905 | 5.90 |
| 55 | 2465 | 5.30 |
| 57 | 2187 | 4.90 |
| 59 | 3550 | 6.70 |
| 61 | 2801 | 5.70 |
| 63 | 3850 | 7.10 |
| 65 | 2416 | 5.20 |
| 67 | 3872 | 7.20 |
| 69 | 3919 | 7.20 |
| 71 | 3323 | 6.40 |
| 73 | 2372 | 5.20 |
| 75 | 4774 | 8.40 |
| 77 | 403 | 2.50 |
| 79 | 0 | 0.00 |
| | Average Conductivity (md-ft) 2889 | |

TABLE XXII

TSO Inventive Method

Frac Summary * EUGENE ISLAND BLK 316, WELL A-8, PER SPE 24844
Filename: EUGA8H.FRK; Oct 19, 92

Design Data

| | | |
|---|---|---|
| FLUID LOSS: | Coefficient (ft/sqrt(min)) | 0.00090/0.00700 |
| | Spurt Loss (gal/100 sq ft) | 4.00/0.00 |
| FORMATION: | Modulus (MM psi) | 0.20 |
| | Fracture Height (ft) | 110.0 |
| | Fluid Loss Height (ft) | 110.0 |
| | Perforated Height (ft) | 110.0 |
| | Permeability (md) | 4.000 |
| | Overlying Stress Difference (psi) | 1 |
| | Overlying Modulus (MM psi) | 0.20 |
| | Underlying Stress Difference (psi) | 1 |
| | Underlying Modulus (MM psi) | 0.20 |
| TEMPERATURE: | Bottom Hole (deg F.) | 125 |
| PRESSURE: | Reservoir Pressure (psi) | 5550.0 |
| | Closure Pressure (psi) | 5900.0 |
| DEPTH: | Well Depth (ft) | 6668 |
| 3-D SIMULATOR | Step Size (ft) | 2.0 |
| PROGRAM CONTROL | Time Step (min) | Automatic |

Calculated Results from 3-D Simulator
STIMPLAN (TM), NSI, Tulsa, OK
Licensed To: Baker Sand Control

| | | |
|---|---|---|
| ½ LENGTH: | 'Hydraulic' length (ft) | 79 |
| | Propped length (ft) | 78 |
| PRESSURE: | Max Net Pressure (psi) | 201 |
| | Surface Pres @ End of Pad (psi) | 4169 |
| | Surface Pres @ End of Job (psi) | 5395 |
| | Maximum Hydraulic Horsepower | 405 |
| TIME: | Max Exposure to Form. Temp. (min) | 177.7 |
| | Time to Close (min) | 953.7 |
| RATE: | Fluid Loss Rate during pad (bpm) | 1.1 |
| EFFICIENCY: | at end of pumping schedule | 0.74 |
| PROPPANT: | Average In Situ Conc. (#/sq ft) | 5.6 |
| | Average Conductivity (md-ft) | 2694 |
| HEIGHT: | Max Fracture Height (ft) | 169 |
| WIDTH: | Avg width at end of pumping (in) | 1.42 |

STIMPLAN (TM), NSI Technologies, Tulsa, OK
Licensed To: Baker Sand Control
WELL ID:
EUGENE ISLAND BLK 316, WELL A-8, PER SPE 24844

| | | |
|---|---|---|
| DEPTH: | Well Depth (ft) | 6668 |
| PRESSURE: | Reservoir Pressure (psi) | 5550 |
| | Closure Pressure (psi) | 5900 |
| TEMPERATURE: | Bottom Hole Temperature (deg F.) | 125 |

Pumping Schedule

| S1 Vol (Mgal) | F1 Vol (Mgal) | Conc (ppg) | Rate (bpm) | Fluid Type | Prop Type | Cum Prop (M-lb) | Pump Time (min) |
|---|---|---|---|---|---|---|---|
| 2.6 | 2.6 | 0.0 | 3.0 | 2 | 1 | 0.0 | 20.6 |
| 3.7 | 3.4 | 2.0 | 3.0 | 1 | 1 | 6.8 | 29.3 |
| 3.0 | 2.6 | 3.0 | 3.0 | 1 | 1 | 14.7 | 23.8 |
| 3.0 | 2.5 | 4.0 | 3.0 | 1 | 1 | 24.8 | 23.8 |
| 3.0 | 2.4 | 6.0 | 3.0 | 1 | 1 | 39.0 | 23.8 |
| 3.0 | 2.2 | 8.0 | 3.0 | 1 | 1 | 56.6 | 23.8 |
| 3.0 | 2.1 | 10.0 | 3.0 | 1 | 1 | 77.2 | 23.8 |

TABLE XXII-continued

TSO Inventive Method

| | | | | | | | | | |
|---|---|---|---|---|---|---|---|---|---|
| 3.0 | 1.9 | 12.0 | 3.0 | 1 | 1 | 100.5 | | 23.8 | |
| 3.0 | 1.8 | 14.0 | 3.0 | 1 | 1 | 126.2 | | 23.9 | |

| | | | | |
|---|---|---|---|---|
| Total Slurry | 27.3 | Total Fluid | 21.6 | |
| Total Proppant | 126.2 | Avg. Conc | 5.9 | |
| Total Pump Time | 216.5 min | | | |

| Proppant ID No. 1 | 20–40 Ottawa_Snd | | | | |
|---|---|---|---|---|---|
| Specific Gravity | | | | | 2.65 |
| 'Damage Factor' | | | | | 0.70 |
| Proppant Stress (Mpsi) | 0 | 2 | 4 | 8 | 16 |
| KfW @ 2 #/sq ft (md-ft) | 4800 | 3850 | 2750 | 990 | 50 |

| Fluid ID No. 2 | Perfflow_KCl_100_F | | | | |
|---|---|---|---|---|---|
| | Specific Gravity | 1.04 | | | |
| | @Welbor | @Formtmp | @1 Hr | @2 Hr | @4 Hr | @8 Hr |
| vis (cp @ 170 1/sec) | 500 | 320 | 63 | 30 | 10 | 10 |
| non-Newtonian n' | 0.60 | 0.66 | 0.78 | 0.84 | 0.90 | 0.90 |
| K(lbysec/ft 2) × 1000 | 79.93 | 37.59 | 4.00 | 1.40 | 0.34 | 0.34 |

| Q (bpm) | P/dL (psi/100 ft) |
|---|---|
| 1.0 | 12.1 |
| 2.0 | 15.0 |
| 3.0 | 17.0 |
| 4.0 | 18.5 |
| 5.0 | 19.8 |
| Measured Depth (ft) | 6668.0 |

| Fluid ID No. 1 | 75_lb/1000_gal_HEC-10 | | | | |
|---|---|---|---|---|---|
| | Specific Gravity | 1.04 | | | |
| | @Welbor | @Formtmp | @1 Hr | @2 Hr | @4 Hr | @8 Hr |
| vis (cp @ 170 1/sec) | 267 | 185 | 185 | 185 | 107 | 66 |
| non-Newtonian n' | 0.33 | 0.45 | 0.45 | 0.45 | 0.60 | 0.65 |
| K(lbysec/ft 2) × 1000 | 170.80 | 63.90 | 63.90 | 63.90 | 17.11 | 8.16 |

Time History * NSI STIMPLAN 3-D Fracture Simulation
EUGENE ISLAND BLK 316, WELL A-8, PER SPE 24844

| Time (min) | Pen (ft) | Pres (psi) | Rate (bpm) | Prop (PPG) | S1 Vol (MGal) | Eff-ciency | Loss (bpm) | Hght (ft) | W-Avg (in) |
|---|---|---|---|---|---|---|---|---|---|
| 7.7 | 6 | 138 | 3.0 | 0.0 | 1.0 | 0.79 | 0.4 | 111 | 0.98 |
| 13.6 | 8 | 138 | 3.0 | 0.0 | 1.7 | 0.81 | 0.4 | 111 | 1.26 |
| 15.4 | 10 | 138 | 3.0 | 0.0 | 1.9 | 0.79 | 0.8 | 111 | 1.14 |
| 16.8 | 12 | 138 | 3.0 | 0.0 | 2.1 | 0.77 | 0.9 | 111 | 1.04 |
| 18.0 | 14 | 138 | 3.0 | 0.0 | 2.3 | 0.76 | 1.1 | 111 | 0.94 |
| 19.0 | 16 | 138 | 3.0 | 0.0 | 2.4 | 0.74 | 1.4 | 112 | 0.86 |
| 19.9 | 18 | 138 | 3.0 | 0.0 | 2.5 | 0.72 | 1.4 | 112 | 0.79 |
| 20.6 | 19 | 138 | 3.0 | 0.0 | 2.6 | 0.73 | 0.7 | 112 | 0.80 |
| 22.5 | 21 | 138 | 3.0 | 2.0 | 2.8 | 0.72 | 1.1 | 112 | 0.78 |
| 24.5 | 23 | 138 | 3.0 | 2.0 | 3.1 | 0.72 | 0.9 | 112 | 0.78 |
| 26.5 | 25 | 138 | 3.0 | 2.0 | 3.3 | 0.71 | 0.9 | 112 | 0.77 |
| 28.6 | 27 | 138 | 3.0 | 2.0 | 3.6 | 0.71 | 1.0 | 113 | 0.76 |
| 30.7 | 29 | 138 | 3.0 | 2.0 | 3.9 | 0.70 | 0.9 | 113 | 0.75 |
| 32.9 | 31 | 138 | 3.0 | 2.0 | 4.1 | 0.70 | 1.0 | 113 | 0.74 |
| 35.0 | 33 | 138 | 3.0 | 2.0 | 4.4 | 0.70 | 0.9 | 113 | 0.74 |
| 37.1 | 35 | 138 | 3.0 | 2.0 | 4.7 | 0.69 | 1.0 | 113 | 0.73 |
| 39.4 | 37 | 138 | 3.0 | 2.0 | 5.0 | 0.69 | 1.0 | 114 | 0.73 |
| 41.6 | 39 | 138 | 3.0 | 2.0 | 5.2 | 0.69 | 1.0 | 114 | 0.73 |
| 44.0 | 41 | 138 | 3.0 | 2.0 | 5.5 | 0.69 | 1.1 | 114 | 0.73 |
| 46.2 | 43 | 138 | 3.0 | 2.0 | 5.8 | 0.69 | 1.0 | 114 | 0.73 |
| 48.6 | 45 | 138 | 3.0 | 2.0 | 6.1 | 0.68 | 1.0 | 114 | 0.73 |
| 51.1 | 47 | 138 | 3.0 | 2.0 | 6.4 | 0.68 | 1.1 | 115 | 0.73 |
| 53.5 | 49 | 138 | 3.0 | 3.0 | 6.7 | 0.68 | 1.0 | 115 | 0.73 |
| 56.1 | 51 | 138 | 3.0 | 3.0 | 7.1 | 0.68 | 1.1 | 115 | 0.73 |
| 58.6 | 53 | 138 | 3.0 | 3.0 | 7.4 | 0.68 | 1.0 | 115 | 0.73 |
| 61.3 | 55 | 138 | 3.0 | 3.0 | 7.7 | 0.67 | 1.1 | 115 | 0.73 |
| 63.9 | 57 | 138 | 3.0 | 3.0 | 8.1 | 0.67 | 1.0 | 125 | 0.73 |
| 68.3 | 59 | 138 | 3.0 | 3.0 | 8.6 | 0.67 | 1.0 | 129 | 0.70 |
| 78.1 | 61 | 137 | 3.0 | 3.0 | 9.8 | 0.68 | 0.9 | 134 | 0.76 |
| 83.7 | 63 | 136 | 3.0 | 4.0 | 10.5 | 0.68 | 0.9 | 138 | 0.76 |
| 90.8 | 65 | 134 | 3.0 | 4.0 | 11.4 | 0.68 | 0.9 | 143 | 0.77 |
| 97.1 | 67 | 132 | 3.0 | 4.0 | 12.2 | 0.68 | 0.9 | 147 | 0.78 |
| 103.5 | 69 | 130 | 3.0 | 6.0 | 13.0 | 0.68 | 0.9 | 151 | 0.79 |
| 110.3 | 71 | 128 | 3.0 | 6.0 | 13.9 | 0.69 | 0.9 | 156 | 0.79 |
| 117.3 | 73 | 126 | 3.0 | 6.0 | 14.8 | 0.69 | 0.9 | 160 | 0.80 |
| 124.2 | 75 | 124 | 3.0 | 6.0 | 15.6 | 0.69 | 0.9 | 165 | 0.81 |
| 131.5 | 77 | 122 | 3.0 | 8.0 | 16.6 | 0.69 | 0.9 | 169 | 0.81 |
| 139.3 | 79 | 121 | 3.0 | 8.0 | 17.5 | 0.69 | 0.8 | 169 | 0.85 |
| ScreenOut in Stage 1 at Time = 139.3 min at 78 ft | | | | | | | | | |
| 152.8 | 79 | 134 | 3.0 | 8.0 | 19.3 | 0.70 | 0.6 | 169 | 0.95 |
| 166.3 | 79 | 148 | 3.0 | 10.0 | 21.0 | 0.71 | 0.5 | 169 | 1.05 |
| 179.8 | 79 | 162 | 3.0 | 10.0 | 22.6 | 0.72 | 0.5 | 169 | 1.15 |

TABLE XXII-continued

TSO Inventive Method

ScreenOut in Stage 2 at Time = 179.8 min at 76 ft

| | | | | | | | | | |
|---|---|---|---|---|---|---|---|---|---|
| 193.3 | 79 | 177 | 3.0 | 12.0 | 24.4 | 0.73 | 0.5 | 169 | 1.25 |
| 206.8 | 79 | 191 | 3.0 | 14.0 | 26.0 | 0.74 | 0.4 | 169 | 1.35 |
| 216.5 | 79 | 201 | 3.0 | 14.0 | 27.3 | 0.74 | 0.4 | 169 | 1.42 |
| 351.7 | 79 | 181 | 0.0 | 0.0 | 27.3 | 0.67 | 0.3 | 169 | 1.29 |
| 505.8 | 79 | 161 | 0.0 | 0.0 | 27.3 | 0.60 | 0.3 | 169 | 1.15 |
| 707.6 | 79 | 141 | 0.0 | 0.0 | 27.3 | 0.53 | 0.2 | 169 | 1.02 |
| 928.7 | 79 | 121 | 0.0 | 0.0 | 27.3 | 0.46 | 0.2 | 169 | 0.90 |
| 1170.2 | 79 | 101 | 0.0 | 0.0 | 27.3 | 0.40 | 0.2 | 169 | 0.79 |

GEOMETRY SUMMARY * At End of Pumping Schedule
EUGENE ISLAND BLK 316, WELL A-8, PER SPE 24844

| Dstnce (ft) | Press (psi) | W-Avg (in) | Q (bpm) | Sh-Rate (1/sec) | Hght (ft) Total | Up | Dn | Prop | Bank Fraction | Prop (PSF) |
|---|---|---|---|---|---|---|---|---|---|---|
| 2 | 201 | 1.73 | 1.5 | 0 | 169 | 29 | 29 | 169 | 0.01 | 9.31 |
| 5 | 201 | 1.73 | 1.4 | 0 | 169 | 29 | 29 | 169 | 0.01 | 9.36 |
| 7 | 201 | 1.73 | 1.3 | 0 | 169 | 29 | 29 | 169 | 0.01 | 9.36 |
| 9 | 201 | 1.73 | 1.3 | 0 | 169 | 29 | 29 | 169 | 0.01 | 8.68 |
| 11 | 201 | 1.72 | 1.2 | 0 | 169 | 29 | 29 | 169 | 0.01 | 8.58 |
| 13 | 201 | 1.72 | 1.2 | 0 | 169 | 29 | 29 | 169 | 0.01 | 8.64 |
| 15 | 201 | 1.72 | 1.1 | 0 | 169 | 29 | 29 | 169 | 0.01 | 8.66 |
| 17 | 201 | 1.72 | 1.1 | 0 | 169 | 29 | 29 | 169 | 0.01 | 7.83 |
| 20 | 201 | 1.72 | 1.0 | 0 | 168 | 29 | 29 | 168 | 0.01 | 7.74 |
| 22 | 201 | 1.71 | 1.0 | 0 | 167 | 28 | 28 | 167 | 0.01 | 7.77 |
| 24 | 201 | 1.70 | 0.9 | 0 | 165 | 28 | 28 | 165 | 0.01 | 7.46 |
| 26 | 201 | 1.69 | 0.9 | 0 | 164 | 27 | 27 | 164 | 0.01 | 6.64 |
| 28 | 201 | 1.68 | 0.8 | 0 | 162 | 26 | 26 | 162 | 0.01. | 6.64 |
| 30 | 201 | 1.67 | 0.8 | 0 | 160 | 25 | 25 | 160 | 0.01 | 6.65 |
| 32 | 201 | 1.65 | 0.7 | 0 | 158 | 24 | 24 | 158 | 0.01 | 6.41 |
| 34 | 201 | 1.64 | 0.7 | 0 | 156 | 23 | 23 | 156 | 0.01 | 5.35 |
| 36 | 201 | 1.63 | 0.6 | 0 | 154 | 22 | 22 | 154 | 0.01 | 5.35 |
| 38 | 201 | 1.61 | 0.6 | 0 | 152 | 21 | 21 | 152 | 0.01 | 5.34 |
| 40 | 201 | 1.59 | 0.5 | 0 | 149 | 20 | 20 | 149 | 0.01 | 5.35 |
| 42 | 201 | 1.57 | 0.5 | 0 | 146 | 18 | 18 | 146 | 0.01 | 4.15 |
| 44 | 201 | 1.55 | 0.4 | 0 | 143 | 17 | 17 | 143 | 0.01 | 3.86 |
| 46 | 201 | 1.53 | 0.4 | 0 | 140 | 15 | 15 | 140 | 0.01 | 3.85 |
| 48 | 201 | 1.51 | 0.4 | 0 | 137 | 13 | 13 | 137 | 0.01 | 3.85 |
| 50 | 201 | 1.48 | 0.3 | 0 | 133 | 11 | 11 | 133 | 0.01 | 3.70 |
| 52 | 201 | 1.45 | 0.3 | 0 | 129 | 9 | 9 | 129 | 0.01 | 3.02 |
| 54 | 201 | 1.42 | 0.3 | 0 | 125 | 7 | 7 | 125 | 0.01 | 3.04 |
| 56 | 201 | 1.33 | 0.2 | 0 | 112 | 1 | 1 | 112 | 0.01 | 2.94 |
| 58 | 201 | 1.32 | 0.2 | 0 | 110 | 0 | 0 | 110 | 0.01 | 3.03 |
| 60 | 201 | 1.32 | 0.2 | 0 | 110 | 0 | 0 | 110 | 0.01 | 3.14 |
| 62 | 201 | 1.25 | 0.1 | 0 | 104 | 0 | 0 | 104 | 0.01 | 2.41 |
| 64 | 201 | 1.17 | 0.1 | 0 | 97 | 0 | 0 | 97 | 0.01 | 2.24 |
| 66 | 201 | 1.08 | 0.1 | 0 | 90 | 0 | 0 | 90 | 0.01 | 2.36 |
| 68 | 201 | 0.99 | 0.1 | 0 | 82 | 0 | 0 | 82 | 0.02 | 2.58 |
| 70 | 201 | 0.88 | 0.0 | 0 | 73 | 0 | 0 | 73 | 0.02 | 2.71 |
| 72 | 201 | 0.75 | 0.0 | 0 | 62 | 0 | 0 | 62 | 0.03 | 2.80 |
| 74 | 201 | 0.58 | 0.0 | 0 | 48 | 0 | 0 | 48 | 0.05 | 3.08 |
| 76 | 201 | 0.44 | 0.0 | 0 | 37 | 0 | 0 | 37 | 0.53 | 3.67 |
| 78 | 162 | 0.43 | 0.0 | 0 | 37 | 0 | 0 | 37 | 0.92 | 3.66 |

FLUID SUMMARY * At End of Pumping Schedule
EUGENE ISLAND BLK 316, WELL A-8, PER SPE 24844

| Stage No | Gone | Fluid ID | Prop ID | Pos (ft) | Concentration In | Now | Desgn | Fl Vol (MGal) | Ex Tim (min) | Temp (deg F) | Visc (cp) | Fall Frac |
|---|---|---|---|---|---|---|---|---|---|---|---|---|
| 1 | 1 | 2 | 1 | 79 | 0.0 | 0.0 | 0.0 | 1.0 | 81.7 | 125 | 97 | 0.00 |
| 1 | 1 | 2 | 1 | 79 | 0.0 | 0.0 | 0.0 | 1.7 | 88.4 | 125 | 87 | 0.00 |
| 1 | 1 | 2 | 1 | 79 | 0.0 | 0.0 | 0.0 | 1.9 | 101.3 | 125 | 71 | 0.00 |
| 1 | 1 | 2 | 1 | 79 | 0.0 | 0.0 | 0.0 | 2.1 | 104.3 | 125 | 68 | 0.00 |
| 1 | 1 | 2 | 1 | 79 | 0.0 | 0.0 | 0.0 | 2.3 | 111.9 | 125 | 60 | 0.00 |
| 1 | 1 | 2 | 1 | 78 | 0.0 | 0.0 | 0.0 | 2.4 | 109.9 | 125 | 62 | 0.00 |
| 1 | 0 | 2 | 1 | 78 | 0.0 | 0.0 | 0.0 | 2.5 | 109.9 | 125 | 62 | 0.00 |
| 1 | 1 | 2 | 1 | 79 | 0.0 | 0.0 | 0.0 | 2.6 | 145.5 | 125 | 40 | 0.00 |
| 2 | 1 | 1 | 1 | 78 | 2.0 | 44.2 | 0.0 | 2.6 | 145.5 | 125 | 1024 | 0.00 |
| 2 | 1 | 1 | 1 | 78 | 2.0 | 44.2 | 0.0 | 2.8 | 141.3 | 125 | 1063 | 0.00 |
| 2 | 1 | 1 | 1 | 77 | 2.0 | 44.2 | 0.0 | 3.1 | 139.1 | 125 | 1084 | 0.00 |
| 2 | 0 | 1 | 1 | 76 | 2.0 | 30.9 | 1.3 | 3.3 | 177.7 | 125 | 767 | 0.00 |
| 2 | 0 | 1 | 1 | 74 | 2.0 | 12.9 | 2.1 | 3.6 | 173.4 | 125 | 797 | 0.09 |
| 2 | 0 | 1 | 1 | 72 | 2.0 | 9.3 | 2.7 | 3.8 | 171.2 | 125 | 813 | 0.09 |
| 2 | 0 | 1 | 1 | 71 | 2.0 | 7.6 | 3.2 | 4.0 | 168.9 | 125 | 830 | 0.08 |
| 2 | 0 | 1 | 1 | 70 | 2.0 | 6.5 | 3.7 | 4.3 | 166.5 | 125 | 848 | 0.08 |
| 2 | 0 | 1 | 1 | 68 | 2.0 | 5.8 | 4.1 | 4.5 | 161.8 | 125 | 884 | 0.07 |
| 2 | 0 | 1 | 1 | 67 | 2.0 | 5.1 | 4.6 | 4.7 | 159.3 | 125 | 904 | 0.07 |
| 2 | 0 | 1 | 1 | 66 | 2.0 | 4.4 | 5.3 | 4.9 | 156.8 | 125 | 925 | 0.07 |
| 2 | 0 | 1 | 1 | 65 | 2.0 | 4.0 | 5.9 | 5.2 | 151.6 | 125 | 969 | 0.07 |
| 2 | 0 | 1 | 1 | 64 | 2.0 | 3.7 | 6.5 | 5.4 | 149.0 | 125 | 992 | 0.07 |
| 2 | 0 | 1 | 1 | 62 | 2.0 | 3.4 | 6.9 | 5.6 | 149.0 | 125 | 992 | 0.06 |
| 2 | 0 | 1 | 1 | 62 | 2.0 | 3.3 | 7.2 | 5.8 | 145.5 | 125 | 1023 | 0.06 |

TABLE XXII-continued

TSO Inventive Method

| | | | | | | | | | | | | |
|---|---|---|---|---|---|---|---|---|---|---|---|---|
| 3 | 0 | 1 | 1 | 61 | 3.0 | 5.0 | 7.4 | 5.9 | 145.5 | 125 | 1023 | 0.05 |
| 3 | 0 | 1 | 1 | 60 | 3.0 | 4.8 | 7.7 | 6.1 | 138.4 | 125 | 1091 | 0.05 |
| 3 | 0 | 1 | 1 | 59 | 3.0 | 4.7 | 8.0 | 6.3 | 138.4 | 125 | 1091 | 0.05 |
| 3 | 0 | 1 | 1 | 58 | 3.0 | 4.5 | 8.3 | 6.6 | 130.8 | 125 | 1168 | 0.05 |
| 3 | 0 | 1 | 1 | 56 | 3.0 | 4.4 | 8.6 | 6.8 | 130.8 | 125 | 1168 | 0.05 |
| 3 | 0 | 1 | 1 | 55 | 3.0 | 4.3 | 8.9 | 7.1 | 124.4 | 125 | 1237 | 0.04 |
| 3 | 0 | 1 | 1 | 54 | 3.0 | 4.1 | 9.2 | 7.4 | 117.7 | 125 | 1287 | 0.04 |
| 3 | 0 | 1 | 1 | 51 | 3.0 | 4.0 | 9.6 | 7.9 | 117.7 | 125 | 1287 | 0.04 |
| 4 | 0 | 1 | 1 | 49 | 4.0 | 5.3 | 9.8 | 8.3 | 111.3 | 125 | 1287 | 0.04 |
| 4 | 0 | 1 | 1 | 47 | 4.0 | 5.1 | 10.2 | 8.8 | 97.8 | 125 | 1287 | 0.03 |
| 4 | 0 | 1 | 1 | 45 | 4.0 | 5.0 | 10.6 | 9.4 | 90.8 | 125 | 1287 | 0.03 |
| 4 | 0 | 1 | 1 | 42 | 4.0 | 4.8 | 10.9 | 9.9 | 83.8 | 125 | 1287 | 0.03 |
| 5 | 0 | 1 | 1 | 40 | 6.0 | 7.2 | 11.2 | 10.4 | 76.3 | 125 | 1287 | 0.02 |
| 5 | 0 | 1 | 1 | 38 | 6.0 | 7.1 | 11.5 | 11.0 | 65.6 | 125 | 1287 | 0.02 |
| 5 | 0 | 1 | 1 | 35 | 6.0 | 6.9 | 11.7 | 11.6 | 52.1 | 125 | 1287 | 0.02 |
| 5 | 0 | 1 | 1 | 33 | 6.0 | 6.8 | 12.0 | 11.9 | 52.1 | 125 | 1287 | 0.02 |
| 6 | 0 | 1 | 1 | 32 | 8.0 | 9.2 | 12.0 | 12.1 | 52.1 | 125 | 1287 | 0.01 |
| 6 | 0 | 1 | 1 | 30 | 8.0 | 9.0 | 12.2 | 12.7 | 38.6 | 125 | 1287 | 0.01 |
| 6 | 0 | 1 | 1 | 28 | 8.0 | 8.9 | 12.4 | 13.4 | 25.1 | 125 | 1287 | 0.01 |
| 6 | 0 | 1 | 1 | 25 | 8.0 | 8.8 | 12.6 | 13.8 | 11.6 | 125 | 1287 | 0.01 |
| 7 | 0 | 1 | 1 | 23 | 10.0 | 11.0 | 12.6 | 14.4 | 11.6 | 125 | 1287 | 0.01 |
| 7 | 0 | 1 | 1 | 19 | 10.0 | 10.8 | 12.9 | 15.5 | 0.0 | 109 | 1614 | 0.01 |
| 7 | 0 | 1 | 1 | 17 | 10.0 | 10.6 | 13.2 | 15.7 | 0.0 | 82 | 2371 | 0.00 |
| 8 | 0 | 1 | 1 | 14 | 12.0 | 12.7 | 13.2 | 16.6 | 0.0 | 80 | 2445 | 0.00 |
| 8 | 0 | 1 | 1 | 10 | 12.0 | 12.5 | 13.4 | 17.6 | 0.0 | 78 | 2546 | 0.00 |
| 9 | 0 | 1 | 1 | 8 | 14.0 | 14.6 | 13.5 | 17.6 | 0.0 | 76 | 2585 | 0.00 |
| 9 | 0 | 1 | 1 | 6 | 14.0 | 14.3 | 13.7 | 18.7 | 0.0 | 74 | 2680 | 0.00 |
| 9 | 0 | 1 | 1 | 2 | 14.0 | 14.1 | 13.9 | 19.5 | 0.0 | 71 | 2778 | 0.00 |

PROPPANT SUMMARY * At End of Pumping Schedule
EUGENE ISLAND BLK 316, WELL A-8, PER SPE 24844

Lb/Sq-Ft Lost to Embedment    2.000

| Distance (ft) | KfW (md-ft) | Proppant Concentration (lb/sq foot) Prop ID → 1 |
|---|---|---|
| 2 | 5428 | 9.30 |
| 5 | 5463 | 9.40 |
| 7 | 5463 | 9.40 |
| 9 | 4957 | 8.70 |
| 11 | 4883 | 8.60 |
| 13 | 4926 | 8.60 |
| 15 | 4944 | 8.70 |
| 17 | 4326 | 7.80 |
| 20 | 4263 | 7.70 |
| 22 | 4280 | 7.80 |
| 24 | 4050 | 7.50 |
| 26 | 3444 | 6.60 |
| 28 | 3442 | 6.60 |
| 30 | 3449 | 6.60 |
| 32 | 3274 | 6.40 |
| 34 | 2487 | 5.40 |
| 36 | 2483 | 5.30 |
| 38 | 2480 | 5.30 |
| 40 | 2484 | 5.30 |
| 42 | 1599 | 4.20 |
| 44 | 1377 | 3.90 |
| 46 | 1370 | 3.80 |
| 48 | 1374 | 3.90 |
| 50 | 1261 | 3.70 |
| 52 | 759 | 3.00 |
| 54 | 769 | 3.00 |
| 56 | 698 | 2.90 |
| 58 | 762 | 3.00 |
| 60 | 849 | 3.10 |
| 62 | 305 | 2.40 |
| 64 | 181 | 2.20 |
| 66 | 264 | 2.40 |
| 68 | 428 | 2.60 |
| 70 | 524 | 2.70 |
| 72 | 596 | 2.80 |
| 74 | 803 | 3.10 |
| 76 | 1239 | 3.70 |
| 78 | 1230 | 3.70 |
| Average Conductivity (md-ft) | 2540 | |

PROPPANT SUMMARY * At Fracture Closure
EUGENE ISLAND BLK 316, WELL A-8, PER SPE 24844

Lb/Sq-Ft Lost to Embedment    2.000

| Distance (ft) | KfW (md-ft) | Proppant Concentration (lb/sq foot) Prop ID → 1 |
|---|---|---|
| 2 | 4353 | 7.80 |

TABLE XXII-continued

TSO Inventive Method

| | | |
|---|---|---|
| 5 | 4437 | 8.00 |
| 7 | 4461 | 8.00 |
| 9 | 4441 | 8.00 |
| 11 | 4024 | 7.40 |
| 13 | 4022 | 7.40 |
| 15 | 4049 | 7.40 |
| 17 | 4065 | 7.50 |
| 20 | 3712 | 7.00 |
| 22 | 3553 | 6.80 |
| 24 | 3716 | 7.00 |
| 26 | 3854 | 7.20 |
| 28 | 3716 | 7.00 |
| 30 | 3106 | 6.20 |
| 32 | 3078 | 6.10 |
| 34 | 3081 | 6.10 |
| 36 | 3058 | 6.10 |
| 38 | 2861 | 5.80 |
| 40 | 2329 | 5.10 |
| 42 | 2391 | 5.20 |
| 44 | 2358 | 5.20 |
| 46 | 2298 | 5.10 |
| 48 | 1881 | 4.50 |
| 50 | 1485 | 4.00 |
| 52 | 1541 | 4.10 |
| 54 | 1574 | 4.10 |
| 56 | 1693 | 4.30 |
| 58 | 1425 | 3.90 |
| 60 | 1226 | 3.60 |
| 62 | 1265 | 3.70 |
| 64 | 1233 | 3.70 |
| 66 | 869 | 3.20 |
| 68 | 859 | 3.20 |
| 70 | 1250 | 3.70 |
| 72 | 1400 | 3.90 |
| 74 | 2196 | 4.90 |
| 76 | 2078 | 4.80 |
| 78 | 1236 | 3.70 |
| Average Conductivity (md-ft) | 2694 | |

The model results indicate the average in situ proppant concentration and average fracture conductivity values for the two methods are within 10%. At the end of pumping, there should be only minor differences between the productivity of the well when comparing current practices to the inventive method. However, the current inventive method reduces horsepower requirements by almost 75%, which eliminates the need for boats and offshore vessels by reducing space requirements. Concerns about embedment are reduced when the inventive method is employed, because the resultant fracture width is 42% wider when compared to the TSO procedures used in SPE 24844. The fluid pad described in the invention could eliminate the need for the data obtained in the injection tests because of the consistency of the fluid loss coefficient over a wide range of permeability. While field tests will be necessary to validate this claim, laboratory testing does support this conclusion.

Many modifications may be made in the composition and implementation of this invention without departing from the spirit and scope thereof which are defined only in the appended claims. For example, the fluid pad and proppant transport fluid may be different than those actually used in these examples. Additionally, a procedure could be envisioned where the proppant transport fluid or other fluid was used to initiate the fracture and the fluid pad is used to propagate the fracture prior to injecting proppant. Also, the various fluids could be used in a procedure to separate the fluid pad and the proppant transport fluid to flush or sweep the fracture prior to placing proppant in the fracture with the proppant transport fluid.

GLOSSARY

| | |
|---|---|
| 40/60 FracSand | Gravel pack sand per API specifications: RP 58 March 31, 1986. |
| AP | Ammonium persulfate. |
| "BARACARB" | Sized calcium carbonate sold by Baroid and manufactured by Metsa-Serla. |
| "BARANEX" | Modified lignosulfonate marketed through Baroid. |
| BHP | Bottom hole pressure. |
| "BIOZAN" | A water soluble polymer used as thixotropic polymer sold by Milpark Drilling Fluids, manufactured by Chemstar. |
| CMHEC/Al | Carboxymethylhydroxyethylcellulose crosslinked with aluminum. |
| "DACALITE 104" | Synthetic silicon sold by Gretco Inc. |
| "FILTREX" | A modified lignosulfonate sold by Milpark Drilling Fluids. |
| LVT-200 | Synthetic oil marketed through Conoco Inc. |
| TVD | True vertical depth. |
| XCD | Xanthan gum marketed by Kelco Inc. |

We claim:
1. A method for hydraulically fracturing and propping a subterranean formation to increase the production of fluids from a well therein comprising the steps of:
   (1) injecting a fluid pad having a first fluid loss coefficient into the well at a pressure sufficient to fracture the formation, whereby a filter cake having a permeability lower than that of the formation is formed on at least part of the fracture;
   (2) injecting a proppant transport fluid into the well, said proppant transport fluid having a second fluid loss coefficient higher than the first fluid loss coefficient; and (3) at least partially removing the filter cake.

2. The method of claim 1 where the fluid pad comprises:
(1) a cake-building solid particulate;
(2) a filtration control additive;
(3) a fluid viscosifier; and
(4) water.

3. The method of claim 2 in which the cake-building solid particulate is graded.

4. The method of claim 2 in which in the fluid pad the cake-building solid particulate is selected from the group consisting of a graded salt, silica, clays, oil soluble particulates, particulates which degrade with time or temperature, and mixtures thereof, where the salt of the graded salt is selected from the group consisting of potassium chloride; sodium chloride; calcium chloride; magnesium chloride; sodium sulfate; sodium carbonate; calcium carbonate; sodium bicarbonate; sodium bromide; potassium bromide; potassium carbonate and mixtures thereof.

5. The method of claim 4 where the lignosulfonate is selected from the group consisting of metal lignosulfonate; modified lignosulfonate and mixtures thereof.

6. The method of claim 2 in which in the fluid pad the filter control additive is selected from the group consisting of lignosulfonate; starch; polyacrylate polymers; silica flour; clays; and mixtures thereof.

7. The method of claim 2 in which in the fluid pad the fluid viscosifier is a thixotropic polymer selected from the group consisting of water soluble cellulose ethers; biopolymers; surfactants; clays; and mixtures thereof.

8. The method of claim 7 in which the biopolymers are selected from the group consisting of xanthan gum; guar gum; welan gum and mixtures thereof.

9. The method of claim 2 where the cake-building solid particulate comprises a distribution of graded calcium carbonate particle sizes and the filter control additive comprises at least one modified lignosulfonate.

10. The method of claim 2 where the fluid pad comprises from about 70 to 90 wt. % water; about 10 to 30 wt. % blend of graded calcium carbonate particle sizes; and from about 2 to about 5 wt. % modified lignosulfonate.

11. The method of claim 2 where the fluid pad comprises from:
about 70 to 90 wt. % water;
about 10 to 30 wt. % of a distribution of graded calcium carbonate particle sizes;
about 2 to 5 wt. % of at least one modified lignosulfonate; and
about 0.25 to 1.25 wt. % of a thixotropic polymer.

12. The method of claim 1 where the proppant transport fluid comprises water and a proppant is selected from the group consisting of sand; silica; ceramic; resin-coated particles, bauxite, and mixtures thereof.

13. The method of claim 12 in which in the proppant transport fluid there is present a fluid viscosifier which is a thixotropic polymer selected from the group consisting of water soluble cellulose ethers; biopolymers; clays; surfactants; and mixtures thereof.

14. The method of claim 1 where the removing of the filter cake comprises converting it to a liquid.

15. The method of claim 1 where the proppant and the fluid pad comprise solid particulates, and where the fluid pad comprises smaller particulates than the proppant.

16. The method of claim 15 where the removing of the filter cake comprises suspending the fluid pad solid particulates and flowing the suspended particulates back out through the proppant.

17. The method of claim 1 where the proppant transport fluid is injected into the formation after the fluid pad is injected.

18. The method of claim 1 where the subterranean formation is at least partially unconsolidated and has an unconfined modulus less than 1,000,000 psi.

19. A method for hydraulically fracturing and propping a subterranean formation to increase the production of fluids from a well therein comprising the steps of:
(1) injecting a fluid pad having a first fluid loss coefficient into the well at a pressure sufficient to fracture the formation, whereby a filter cake having a permeability lower than that of the formation is formed on at least part of the fracture; where the fluid pad comprises:
a cake-building solid particulate;
a filtration control additive;
a fluid viscosifier; and
water;
(2) subsequently injecting a proppant transport fluid into the well, said proppant transport fluid having a second fluid loss coefficient higher than the first fluid loss coefficient; where the proppant transport fluid comprises:
a proppant; and
a fluid media; and
(3) at least partially removing the filter cake.

20. The method of claim 19 where the fluid pad comprises from:
about 70 to 90 wt. % water;
about 10 to 30 wt. % of a distribution of graded calcium carbonate particle sizes;
about 2 to 5 wt. % of at least one modified lignosulfonate; and
about 0.25 to 1.25 wt. % of a thixotropic polymer.

21. The method of claim 19 where the fluid media comprises water and the proppant is selected from the group consisting of sand; silica; ceramic; resin-coated particles; bauxite; and mixtures thereof.

22. The method of claim 19 where the filter cake is removed by converting it to a liquid.

23. The method of claim 19 where the proppant and the fluid pad comprise solid particulates, and where the fluid pad comprises smaller particulates than the proppant.

24. The method of claim 23 where the removing of the filter cake comprises suspending the fluid pad solid particulates and flowing the suspended particulates through the proppant.

25. A method for treating a subterranean formation having a well therein and fractures extending from the well into the subterranean formation, comprising injecting a fluid pad into the well to form a low permeability filter cake on at least part of the fractures where the fluid pad comprises:
(1) a cake-building solid particulate comprising a distribution of graded calcium carbonate particle sizes;
(2) a filtration control additive comprising at least one modified lignosulfonate;
(3) a fluid viscosifier; and
(4) water.

26. The method of claim 25 where the fluid viscosifier is a thixotropic polymer selected from the group consisting of water soluble cellulose ethers; biopolymers; clays; surfactants; and mixtures thereof.

27. The method of claim 25 where the fluid pad comprises from about 70 to 90 wt. % water; about 10 to 30 wt. % blend of graded calcium carbonate particle sizes; and from about 2 to 5 wt. % modified lignosulfonate.

28. The method of claim 27 where the fluid pad comprises:
 about 70 to 90 wt. % water;
 about 10 to 30 wt. % of a distribution of graded calcium carbonate particle sizes;
 about 2 to 5 wt. % of at least one modified lignosulfonate; and
 about 0.25 to 1.25 wt. % of a thixotropic polymer.

* * * * *